US008725819B2

United States Patent
Fujihara et al.

(10) Patent No.: US 8,725,819 B2
(45) Date of Patent: May 13, 2014

(54) CHAT SYSTEM, SERVER DEVICE, CHAT METHOD, CHAT EXECUTION PROGRAM, STORAGE MEDIUM STORED WITH CHAT EXECUTION PROGRAM, INFORMATION PROCESSING UNIT, IMAGE DISPLAY METHOD, IMAGE PROCESSING PROGRAM, STORAGE MEDIUM STORED WITH IMAGE PROCESSING PROGRAM

(75) Inventors: Masahiro Fujihara, Tokyo (JP); Keigo Tamura, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 153 days.

(21) Appl. No.: 13/258,082

(22) PCT Filed: Mar. 17, 2010

(86) PCT No.: PCT/JP2010/054608
§ 371 (c)(1),
(2), (4) Date: Nov. 18, 2011

(87) PCT Pub. No.: WO2010/110155
PCT Pub. Date: Sep. 30, 2010

(65) Prior Publication Data
US 2012/0110099 A1    May 3, 2012

(30) Foreign Application Priority Data
Mar. 23, 2009   (JP) .................. 2009-071017

(51) Int. Cl.
*G06F 15/16* (2006.01)
(52) U.S. Cl.
USPC ........................................................ 709/206
(58) Field of Classification Search
None
See application file for complete search history.

(56) References Cited

U.S. PATENT DOCUMENTS 6,788,667 B1 *  9/2004  Beresin .................... 370/338
6,931,114 B1 *  8/2005  Martin ..................... 379/203.01
(Continued)

FOREIGN PATENT DOCUMENTS

JP   2002183065 A   6/2002
JP   2002251364 A   9/2002
(Continued)

OTHER PUBLICATIONS

International Search Report for corresponding Application PCT/JP2010/054608, dated Jun. 8, 2010.

(Continued)

*Primary Examiner* — Brian P Whipple
(74) *Attorney, Agent, or Firm* — Matthew B. Dernier, Esq.; Gibson & Dernier LLP

(57) ABSTRACT

A matching server, when a chat room specified by participation request information received from a client terminal device is registered in a room storage region, associates and registers that client terminal device to the chat room, and when the chat room specified by the participation request information is not registered, associates the client terminal device and the chat room with each other and registers them newly in the room storage region. When a chat room specified by leave request information received by the client terminal device is registered in the room storage region, it cancels registration of the client terminal device for the chat room, and when there is no client terminal device registered to the registered chat room, it cancels registration of the chat room.

11 Claims, 12 Drawing Sheets

(56) References Cited

U.S. PATENT DOCUMENTS

| | | | |
|---|---|---|---|
| 7,216,144 B1 * | 5/2007 | Morris et al. | 709/204 |
| 7,360,164 B2 * | 4/2008 | Bjoernsen et al. | 715/751 |
| 7,809,842 B2 * | 10/2010 | Moran et al. | 709/227 |
| 8,037,147 B1 * | 10/2011 | Herold et al. | 709/206 |
| 2003/0046221 A1 | 3/2003 | Hora | |
| 2008/0005240 A1 * | 1/2008 | Knighton et al. | 709/204 |

FOREIGN PATENT DOCUMENTS

| | | |
|---|---|---|
| JP | 2003044419 A | 2/2003 |
| JP | 2003150820 A | 5/2003 |
| JP | 2003178016 A | 6/2003 |
| JP | 2005167345 A | 6/2005 |
| JP | 2005530233 A | 10/2005 |
| WO | 03107138 A2 | 12/2003 |

OTHER PUBLICATIONS

Office Action for corresponding JP Patent Application No. 2011-506003, dated Sep. 20, 2013.

Office Action for corresponding JP Patent Application No. 2011-506003, dated May 10, 2013.

* cited by examiner

CHAT SYSTEM, SERVER DEVICE, CHAT METHOD, CHAT EXECUTION PROGRAM, STORAGE MEDIUM STORED WITH CHAT EXECUTION PROGRAM, INFORMATION PROCESSING UNIT, IMAGE DISPLAY METHOD, IMAGE PROCESSING PROGRAM, STORAGE MEDIUM STORED WITH IMAGE PROCESSING PROGRAM

TECHNICAL FIELD

The present invention relates to a chat system, a server device, a chat method, a chat execution program, a storage medium stored with the chat execution program, an information processing unit, an image display method, an image processing program, and a storage medium stored with the image processing program.

BACKGROUND ART

With a typical text chat system, a chat text or the like used by a client terminal is stored and managed as chat log data in a server database.

PRIOR ART DOCUMENTS

Patent Documents

[Patent Document 1] JP 2003-178016A

SUMMARY OF THE INVENTION

Problem to be Solved by the Invention

However, with the configuration of the server database which stores and manages a chat text or the like used by a client terminal, the number of inactive chat rooms in which no users have taken part for a long period of time tends to increase accumulatively and the remaining capacity of the database may be reduced.

Furthermore, with the above typical text chat system, since chat rooms and chat log data used by the client terminal are managed by a server, the client terminal cannot collectively manage chat rooms in which it may participate.

A first aim of the present invention is to provide a chat system that may effectively use storage capacity of a server device.

A second aim of the present invention is to provide a chat system that allows the client terminal device to collectively manage available chat rooms.

Means of Solving the Problem

A first aspect of the present invention is a chat system in which a plurality of information processing units and a server device are connected allowing transmission and reception of message data via a network.

Each of the information processing units includes a request information generator and a terminal side transmitter-receiver.

The request information generator generates participation request information with which a chat room can be specified in response to a participation request from a user to the chat system, and generates leave request information with which the one chat room can be specified in response to a leave request from the user. The terminal side transmitter-receiver transmits participation request information in response to generation thereof, and transmits leave request information in response to generation of the participation request information.

The server device includes a server side transmitter receiver, a server side storage, a registration controller, a chat controller, and a registration canceller.

The server side transmitter-receiver receives the participation request information and the leave request information. The server side storage allows association of an information processing unit and a chat room and registration thereof.

The registration controller associates the information processing unit to the chat room and registers the associated information in the server side storage when the one chat room specified by the received participation request information is registered in the server side storage, and associates the information processing unit and the chat room to each other and registers the associated information in the server side storage when the one chat room specified by the received participation request information is not registered in the server side storage.

The chat controller controls execution of chat through transmission and reception of message data among a plurality of information processing units associated to the one chat room and registered.

The registration canceller cancels registration of an information processing unit specified by the leave request information and associated to the one chat room once the terminal side transmitter-receiver has received the leave request information, and cancels registration of the one chat room when no information processing unit is registered to the one registered chat room.

A second aspect of the present invention is an information processing unit of a chat system wherein the information processing unit and a server device are connected allowing transmission and reception of message data via a network, and includes a storage and a display controller.

The storage stores room-specific information, which allows the information processing unit in the chat system to specify an available chat room, and room attribute information associated with the room-specific information.

The display controller displays on a display means the room attribute information and room corresponding images corresponding to the room-specific information in a mode allowing visible confirmation that the room-specific information and the room attribute information are associated.

Result of Invention

According to the first aspect of the present invention, required storage capacity of the server device may be kept to a minimum without decreasing the remaining capacity of the storage due to existence of inactive chat rooms.

Moreover, according to the second aspect of the present invention, the user may manage his/her own available chat rooms in an integrated fashion on the information processing unit side.

DESCRIPTION OF REFERENCE NUMERALS

1: client terminal device (information processing device), 2: server device, 10: monitor device, 13: chat execution unit, 14: display control unit, 15: storage unit, 16: chat management unit, 17: storage unit, SYM: chat system

DETAILED DESCRIPTION OF THE INVENTION

[Configuration of Chat System]

Figure 1:
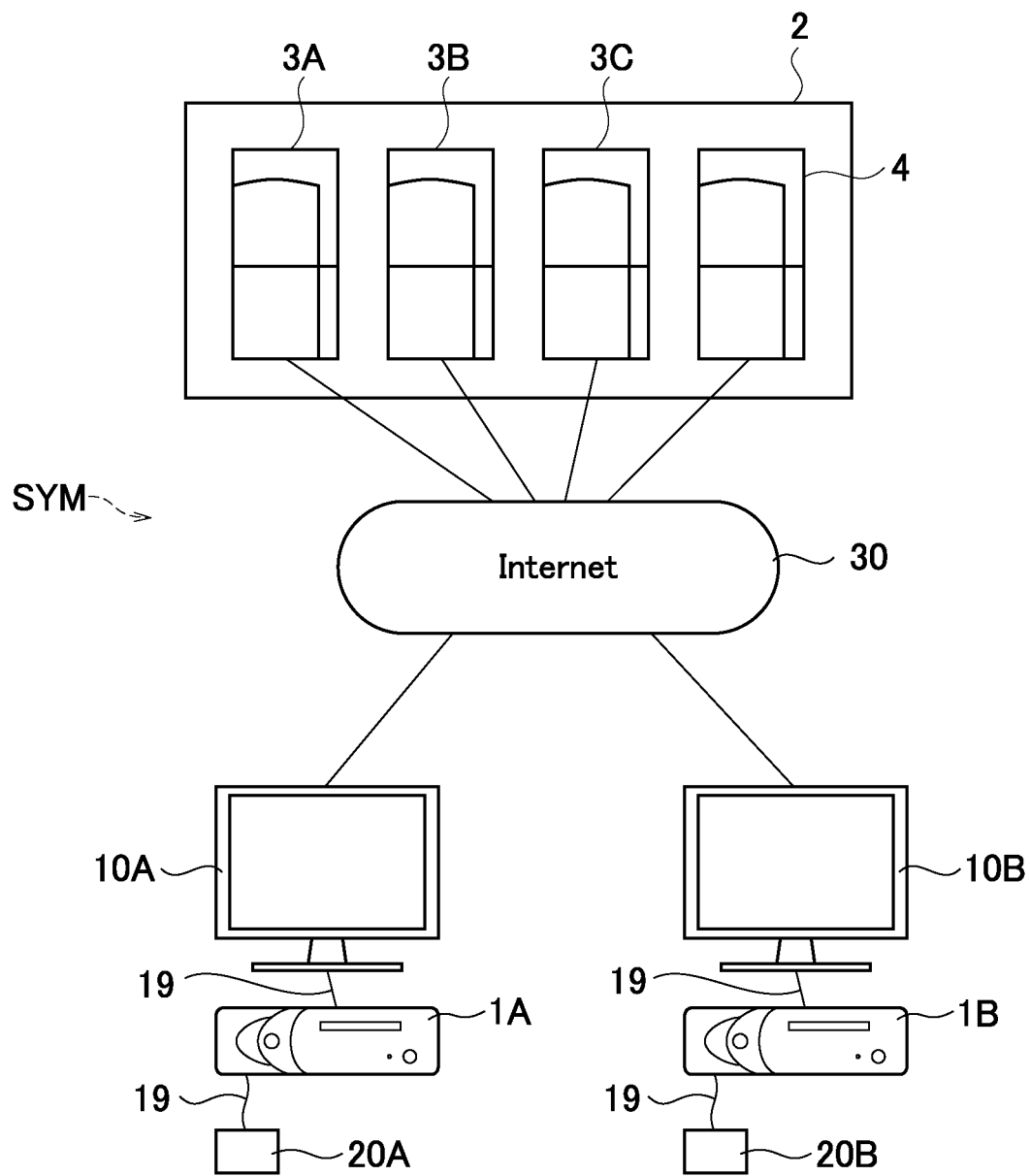
FIG. 1 is a diagram illustrating an outline of a chat system according to a first embodiment.

FIG. 1 is a schematic diagram illustrating an outline of a chat system according to a first embodiment. A chat system SYM includes multiple client terminal devices (information processing units) 1A and 1B, and a server device 2. The server device 2 includes multiple matching server 3A, 3B, and 3C, and a message server 4. Each of the client terminal devices 1, each of the matching servers 3, and the message server 4 are connected to the Internet 30, and carry out data communication via the Internet 30. In the following description, respective users of these client terminal devices 1A and 1B are referred to as users A and B. When the client terminal devices 1A and 1B need not be differentiated, they are merely written as client terminal devices 1, whereas when the respective client terminal devices and the components thereof need to be differentiated, A and B are attached after the respective reference numerals. Similarly, when the matching servers 3A, 3B and 3C need not be differentiated, they are merely written as matching servers 3, whereas when the respective matching servers and the components thereof need to be differentiated, A, B and C are attached after the respective reference numerals. The number of the client terminal device 1 and the matching server 3 is merely an example and is not limited to the above. The matching server 3 and the message server 4 need not be included in one server device 2, and may be provided individually.

The client terminal devices 1 generate participation request information with which a chat room can be specified in response to a user's participation request for the chat system SYM. Moreover, leave request information with which a chat room can be specified is generated in response to a leave request from the user. The client terminal device 1 sends the participation request information in response to generation thereof, and sends the leave request information in response to generation of the leave request information.

The participation request for the chat system SYM from the user includes an establish request for the chat room and an enter request to the chat room. In this case, the client terminal device 1 generates setup request information as the participation request information in response to the establish request, and generates enter request information as the participation request information in response to the enter request.

The matching server 3 receives the participation request information and the leave request information. The client terminal device 1 and the chat room may be associated to each other and registered in a storage unit 17 (shown in FIG. 4) of the matching server 3.

When a chat room specified by the received participation request information is registered in the storage unit 17, the matching server 3 associates the client terminal device 1 to the chat room and registers it in the storage unit 17. Moreover, when the chat room specified by the received participation request information is not registered in the storage unit 17, the client terminal device 1 and a chat room are associated to each other and registered in the storage unit 17.

When the matching server 3 has received setup request information from the client terminal device 1, the client terminal device 1 and a chat room are associated to each other and registered in the storage unit 17. When enter request information is received from the client terminal device 1, it is determined whether the chat room specified by the received enter request information is registered in the storage unit 17. In the case where it is determined that the chat room is registered in the storage unit 17, the client terminal device 1 is associated with the chat room and registered in the storage unit 17. In the case where it is determined that the chat room is not registered in the storage unit 17, the client terminal device 1 and the chat room are associated to each other and registered in the storage unit 17.

The matching server 3 controls execution of a chat through transmission and reception of message data among multiple client terminal devices 1 associated and registered to one chat room.

Upon reception of the leave request information, the matching server 3 cancels the registration of the client terminal device 1 that is associated with the chat room specified by the leave request information. Moreover, when not a single client terminal device 1 is registered to the registered chat room, registration of that chat room is canceled.

In other words, each of the matching servers 3 runs a chat management program described later so as to establish a chat room in response to the setup request (participation request) from the client terminal devices 1, approve the respective client terminal device 1 to enter (participate) the chat room in response to the enter request from the respective client terminal devices 1, and relay transmission and reception of message data (text data) among the client terminal devices 1 that have entered the chat room. Furthermore, each of the matching servers 3 removes the established chat room when all of the client terminal devices 1 have left the chat room. In addition, each of the matching servers 3 re-establishes that chat room upon reception of an enter request from a client terminal device 1 for a chat room that has already been removed. In other words, the respective matching servers 3 have only active chat rooms in which one or more client terminal devices 1 have entered, and have no inactive chat rooms in which no client terminal devices 1 have entered.

Note that while even the message server 4 relays transmission and reception of message data (text data) among the client terminal devices 1, functions thereof differ from the matching servers 3 in that it is not contingent on entering of the chat room. Also note that in the following description, message data transmitted to and received by the matching servers 3 is referred to as chat data so as to differentiate from the message data transmitted to and received by the message server 4.

Each of the client terminal devices 1 has a controller 20 and a monitor device 10 connected thereto via a connection cable 19, respectively. The controller 20 is an operation terminal operated by the user, and supplies to the client terminal device 1 an operation signal according to the operation by the user. Note that the controller 20 needs to be an input device capable of supplying to the client terminal device 1 the operation signal (input signal) according to the user's operation, where various kinds of devices such as a keyboard or a game controller are applicable.

The monitor device 10 displays an image based on an image signal supplied from the client terminal device 1. When starting chat (when entering a chat room), a room selection screen is displayed on the monitor device 10. Images illustrating chat rooms selectable by the user are arranged and displayed on the room selection screen. When the user enters the chat room and executes chat, a chat screen corresponding to that chat room is displayed. The chat screen switches over between a display state and a non-display state in accordance with an instruction from the user. In the case where another client terminal device 1 has entered or left the chat room in use, or case where chat data has been transmitted from another client terminal device 1 while the chat screen is in a non-display state and another screen is displayed, a chat information report screen reporting thereof is displayed overriding the above other screen.

<Main Composition of Client Terminal Device>

Figure 2:
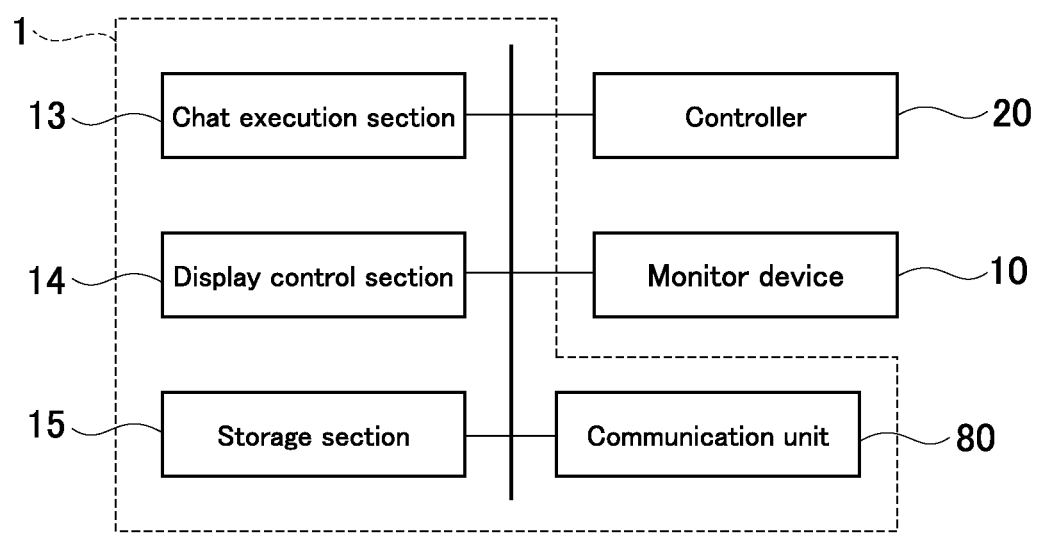
FIG. 2 is a functional block diagram illustrating a configuration of a client terminal device.

Next, the main part of the internal composition of the client terminal device relating to the present invention is described while referencing FIG. 2.

The client terminal device 1 is constituted by a communication unit 80, a chat execution unit 13, a display control unit 14, and a storage unit 15, which are connected to each other via a bus. The client terminal device 1 executes each of the following processing (establish request processing, enter request processing, leave request processing, chat execution processing, invitation transmission processing, invitation reception processing, room selection screen display processing, and chat screen display processing) according to a chat execution program stored in the storage unit 15. In the following description, user-specific information is unique information with which the client terminal device 1 can be identifiable, and is stored in the storage unit 15. A unique user ID pre-assigned to the user of the client terminal device 1, a device ID pre-assigned to the client terminal device 1, or a user email address, for example, may be used as the user-specific information.

A friend management table for registering friends is set up in the storage unit 15. The friend management table is stored with associated user-specific information and user attribute information of another user (friend) to which the chat system SYM is available. The user operates the controller 20 to perform a predetermined input and register the user-specific information in the friend management table. The user attribute information includes information such as user email address, user nickname, image data of an avatar selected by the user, and the like.

The establish request processing is carried out by the controller 20 accepting from the user a predetermined operation input instructing new establishment of a chat room, and the client terminal device 1 receiving an operation signal (room establishment instruction signal) from the controller 20. The establish request processing includes server determination processing and room-specific information determination processing. In the server determination processing, the chat execution unit 13 determines sever selection basis information (server key) using a preset method, and finds and determines based on the above server selection basis information a matching server 3 of the multiple matching servers 3A, 3B, and 3C that is going to establish a chat room in accordance with a preset, predetermined correspondence. In the room-specific information determination processing, the chat execution unit 13 determines unique room-specific information (room key) for the chat room using a preset, predetermined method.

The chat execution unit 13 generates the establish request information including its own user-specific information, and the communication unit 80 transmits the generated establish request information to the above determined matching server 3. Moreover, the chat execution unit 13 generates the establish request information including the above determined room-specific information and its own user-specific information, and the communication unit 80 transmits the generated establish request information to the above determined matching server 3. The setup request processing is completed once the communication unit 80 receives room-specific information (room ID) of the established chat room from the matching server 3.

The chat execution unit 13 associates the above determined room-specific information and server selection basis information and stores them in the storage unit 15. Moreover, the chat execution unit 13 associates the chat room establishment information as chat history information with the room-specific information and stores it. The chat room establishment information includes information indicating establishment date and time of the chat room. The establishment date and time of the chat room should be a date and time specifying execution period of the establish request processing, such as execution start time of the establish request processing or execution end time (when the communication unit 80 receives the room-specific information from the matching server 3) of the establish request processing. The timing of storing the establishment information is preferably at the execution end time of the establish request processing. Note that the various information indicating date and time is acquired by the client terminal device 1 from its own internal clock.

The above predetermined method of determining the server selection basis information should be able to determine unique server selection basis information, where, for example, a method of calculating a hash value through a predetermined hash function using basic data or combination of the user-specific information and the start time of the establish request processing may be employed. In this case, the hash value obtained through calculation becomes the server selection basic information. By combining time to the basic data from which the hash value is calculated, an inconvenience of server selection basic information generating more than once in the same client terminal device 1 may be avoided to the utmost.

The above predetermined correspondence for selecting and determining a single matching server 3 to establish a chat room from among the multiple matching servers 3A, 3B, and 3C should be a relationship in which chat rooms are evenly distributed and allotted to the multiple matching servers 3 (relationship in which one of the unique server IDs given to the respective matching servers 3 is corresponded to the above determined server selection information), where, for example, a hash function set so as to calculate randomly a server ID from server standard basic information (the above hash value) may be used. In this case, the server ID of the matching server 3 to establish a chat room is calculated as the hash value of the server standard basic information.

The above predetermined method of determining the unique room-specific information of the chat room should be able to determine unique room-specific information, where, for example, a method of calculating a hash value through a predetermined hash function using basic data or combination of the user-specific information and the server ID may be employed. In this case, the hash value obtained through calculation becomes the room-specific information.

Note that the above determined correspondence for selecting and determining a matching server 3 is updated in accordance with increase and decrease in number of the matching servers 3. For example, if a manager or the like of the server device 2 increases or decreases the number of the matching servers 3, the server device 2 transmits to each of the client terminal devices 1 server number update information, which includes a new correspondence adjusting to the number of servers after increasing or decreasing. The client terminal devices 1 that have received the server number update information rewrite the old stored correspondence with the new received correspondence.

In the establish request processing, the chat execution unit 13 accepts via the controller 20 an input of room name of the chat room to be established, and the input room name is associated as the room attribute information to the room-specific information and stored. When a room name is not input by the user, a preset default room name is stored.

The enter request processing is carried out by the controller 20 accepting from the user a predetermined operation instructing specification of and entrance into the chat room, and the client terminal device 1 receiving an operation signal (entrance instruction signal) from the controller 20. In the enter request processing, the chat execution unit 13 reads out from the storage unit 15 the server selection basis information and the room-specific information corresponding to the specified chat room, and in the same way as the case of the above establish request processing (according to the above predetermined method using the read-out server selection basis information), the matching server 3 that has established a chat room is specified.

The chat execution unit 13 generates the enter request information including the above read-out room-specific information and the user-specific information, and the communication unit 80 transmits the generated enter request information to the above specified matching server 3. The room-specific information is used for searching for the chat room in the matching server 3. The enter request processing is completed by the communication unit 80 receiving its own entrance completion information from the matching server 3.

On the other hand, in the case where the specified chat room has already been deleted, the chat room is not found by the matching server 3, failing to enter therein. In the case of a failed entrance, the communication unit 80 receives from the matching server 3, entrance failure information indicating to the effect of a failed entrance to the chat room. Once the communication unit 80 receives the entrance failure information, processing proceeds to the above establish request processing. In other words, the chat execution unit 13 generates the establish request information including its own user-specific information, and the setup request information including the room-specific information of the above specified chat room and its own user-specific information, and the communication unit 80 transmits the generated establish request information and setup request information to the matching server 3 to which the above enter request information has been transmitted.

The chat execution unit 13 associates as chat history information, entrance information (own entrance information), which indicates that the chat room has been entered, with the room-specific information and stores it. Its own entrance information includes information indicating date and time of entering the chat room. The date and time of entering the chat room should be a date and time specifying the chat room entered time, such as execution end time of the enter request processing (when the communication unit 80 receives the entrance completion information from the matching server 3) as well as execution start time of the enter request processing. The timing of storing its own entrance information is preferably at the execution end time of the enter request processing.

Moreover, in this embodiment, once the establish request processing is completed, the enter request processing is executed without an operation input from the user as a requirement. Note that in this case, since a chat room is already specified in the establish request processing, the above processing for specifying a matching server 3 and a chat room may be omitted. Furthermore, the enter request processing is independently carried out for each of the multiple chat rooms, where the client terminal device 1 may enter a chat room while remaining in another chat room.

The leave request processing is carried out by the controller 20 accepting from the user a predetermined operation instructing specification and leaving the chat room, and the client terminal device 1 receiving an operation signal (leave instruction signal) from the controller 20. In the leave request processing, the chat execution unit 13 generates leave request information including its own user-specific information, and the communication unit 80 transmits the generated leave request information to the matching server 3. The leave request processing is completed by the communication unit 80 receiving its own leave completion information from the matching server 3.

The chat execution unit 13 associates leave information (own leave information), which indicates that the chat room has been left as chat history information, with the room-specific information and stores it. Its own leave information includes information indicating date and time of leaving the chat room. The timing of storing the date and time of leaving the chat room and the leave information should be a chat room leaving date and time, such as execution end time of the leave request processing, and time when the communication unit 80 receives the leave completion information from the matching server 3 as well as execution start time of the leave request processing.

The chat execution processing continues to be executed while the chat room is occupied (from the end of the enter request processing to the end of the leave request processing). In the chat execution processing, the chat execution unit 13 generates chat data based on an operation signal from the controller 20. The chat execution unit 13 generates transmission data including the above generated chat data and the user-specific information in response to a transmission instruction from the user via the controller 20, and the communication unit 80 transmits the above generated transmission data to one of the entered chat rooms (matching server 3) specified by the user.

The communication unit 80 receives from the matching server 3 entrance completion information of another person indicating that another client terminal device 1 has entered the chat room and leave completion information of the other person indicating that the other client terminal device 1 has left the chat room, or chat data (reception chat data) transmitted from the matching server 3, and reception data including user-specific information of the client terminal devices 1 indicating the respective operating users.

The chat execution unit 13 associates as chat history information the entrance completion information of the other person and the leave completion information of the other person received by the communication unit 80, received message information indicating the received chat data, and user-specific information corresponding thereto with the room-specific information and stores them. The entrance completion information of the other person, the leave completion information of the other person, and the received message information to be stored respectively include information indicating time and date of reception thereof.

The invitation transmission processing is carried out by the controller 20 accepting from the user a predetermined operation for inviting another user (another client terminal device 1) to a chat room, and the client terminal device 1 receiving an operation signal (invite instruction signal) from the controller 20. In the invitation transmission processing, the chat execution unit 13 reads out from the storage unit 15 server selection basis information, room-specific information, and room attribute information associated with the chat room specified by the user (room-specific information), and generates invite information including message data indicating to the effect of inviting to the chat room, its own user-specific information, server selection basis information, room-specific information, and room attribute information. The communication unit 80 transmits the generated invite information to the above specified other client terminal device 1 via the message server 4. Note that the user-specific information of the other client terminal device 1 that transmitted the invite information may be associated as the room attribute information or the chat history information with the room-specific information and then stored.

The invitation reception processing is carried out by the communication unit 80 receiving the invite information from the other client terminal device 1 via the message server 4. In the invitation reception processing, the chat execution unit 13 associates to each other the server selection basis information, the room-specific information, the user-specific information, and the room attribute information included in the invite information received by the communication unit 80 and stores them in the storage unit 15. The user-specific information is stored as the room attribute information.

The room unit screen display processing is carried out by the controller 20 accepting from the user a predetermined operation for instructing display of a room selection screen. In the room selection screen display processing, the display control unit 14 displays the room selection screen on the monitor device 10. Images (room corresponding images) illustrating chat rooms selectable by the user are arranged and displayed on the room selection screen. Each of the room corresponding images includes at least one piece of information of the chat history information and the room attribute information associated with each of the chat rooms (room-specific information) and stored. If the user operates the controller 20 to select and specify one chat room (one of the displayed room corresponding images), the above enter request processing is carried out for the specified chat room.

The chat image display processing is carried out by one chat room being selected and specified with the room selection screen displayed. In the chat screen display processing, the display control unit 14 displays a chat screen on the monitor device 10. On the chat screen, a part of information including the latest information (information of the latest time and date) of the chat history information associated with the specified chat room and stored, and a part of information including at least room name of the room attribute information are displayed. The chat history information is displayed in a time series from the latest information.

The display control unit 14 switches over the chat screen between display state and non-display state in response to an instruction from the user via the controller 20. If non-display state is instructed, the chat screen display processing is temporarily interrupted so that the chat screen is not displayed. However, since the chat screen display processing is temporarily interrupted and not terminated, the chat screen is immediately displayed upon reception of an instruction to switch over to the display state.

If room attribute information of the occupied chat room is added (if room attribute information is associated with the room-specific information and newly stored) when the chat screen is set to the non-display state and another screen is displayed, the display control unit 14 overrides and displays on the above other screen a chat information report screen reporting the added room attribute information.

The chat screen display processing is completed by completing the above leave request processing (leaving the chat room).

<Example of Client Terminal Device>

Figure 3:
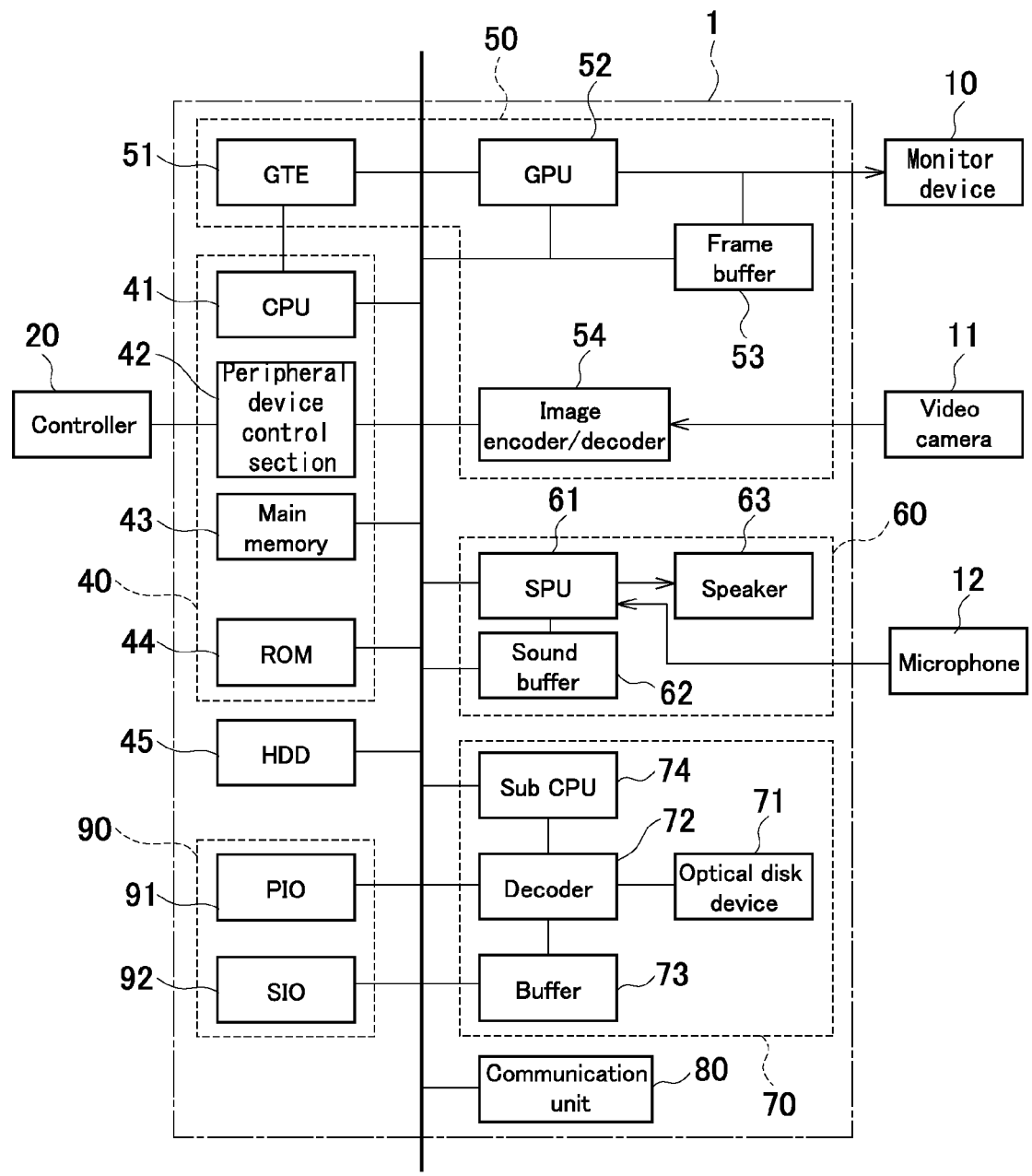
FIG. 3 is a block diagram illustrating an exemplary configuration of the client terminal device.

Next, an example of the client terminal device 1 to which the configuration of FIG. 2 is implemented is described while referencing FIG. 3.

The client terminal device 1 is configured including a control system 40 constituted by a central processing unit (CPU) 41 and peripheral devices thereof, a hard disc drive (HDD) 45, a graphic system 50 constituted by a graphics processing unit (GPU) 52 for rendering images on a frame buffer 53, a sound system 60 constituted by a sound processing unit (SPU) 61 for generating musical sounds, sound effects, and the like, an optical disk control unit 70 for controlling an optical disk on which an application program is recorded, the communication unit 80, an interface unit 90, and buses connecting each of the above units. The CPU 41 functions as the chat execution unit 13 and the display control unit 14, and the graphic system 50 functions as the display control unit 14.

The control system 40 includes the CPU 41, a peripheral device control unit 42 for interrupt control or control of direct memory access (DMA) transfer, main memory 43 constituted by random access memory (RAM), and read only memory (ROM) 44. The main memory 43 functions as the storage unit 15.

The ROM 44 is stored with a program, such as an operating system, for controlling each unit of the client terminal device 1 and an application program for implementing various functions. The CPU 41 reads out the operating system stored in the ROM 44 to the main memory 43, and executes the read out operating system to control the entire client terminal device 1.

The HDD 45 is stored with various types of data and various application programs such as a program for implementing chatting. The CPU 41 reads out to the main memory 43 the chat execution program stored in the HDD 45, and runs the read out chat execution program.

The sound system 60 is controlled by the control system 40 and includes the SPU 61 for controlling voice signals, a sound buffer 62 recorded with waveform data or the like during sound reproduction, and a speaker 63 for outputting musical sounds, sound effects, and the like generated by the SPU 61. Voice signals and voice detected values input from a microphone 12 are input to the sound system 60. The sound system 60 converts the input voice signal into a digital signal, encodes it through voice codec, and supplies it to the communication unit 80. Moreover, in the sound system 60, the voice data obtained over the Internet 30 is supplied to the communication unit 80. The sound system 60 decodes the voice data through voice codec, converts it to analog data to generate waveform data, records it on the sound buffer 62, and then supplies it to the speaker 63.

The optical disk control unit 70 includes an optical disk device 71 for reproducing programs or data recorded on an optical disk, a decoder 72 for decoding programs or data recorded with an error correction code (ECC) attached thereto, for example, and a buffer 73 for temporarily storing data from the optical disk device 71 and thereby allowing reading out of data from the optical disk at a high speed. The decoder 72 is connected to a sub CPU 74.

The interface unit 90 includes a parallel I/O interface (PIO) 91 and a serial I/O interface (SIO) 92. These are interfaces for connecting a memory card, not illustrated in the drawing, to the client terminal device 1.

The graphic system 50 includes a geometry transfer engine (GTE) 51, the GPU 52, the frame buffer 53, and an image encoder/decoder 54. The graphic system 50 is supplied with image data read out from the HDD 45 or image signals from a video camera 11 by the control system 40.

The GTE 51 includes a parallel operation mechanism for executing multiple calculations in parallel, for example, and performs coordinate transformation, light source calculation, matrix or vector calculations at a high speed in response to a calculation request from the CPU 41. The control system 40 sends to the GPU 52 a draw command corresponding to each of the polygons for defining a three-dimensional model as a combination of basic unit figures (polygons) such as triangles or quadrangles based on the calculation result by the GTE 51 and drawing a three-dimensional figure.

The GPU 52 draws a polygon on the frame buffer 53 in compliance with the draw command from the control system 40. The frame buffer 53 stores the image drawn by the GPU 52. This frame buffer 53 is constituted by a so-called dual port RAM and is capable of being drawn by the GPU 52 or receiving from the main memory 43 and reading out for display simultaneously. Moreover, this frame buffer 53 includes a display region from which video output is output, a CLUT region in which is stored a color lock up table (CLUT) to be referenced when the GPU 52 is drawing a polygon or the like, and a texture region in which are stored textures to be inserted (mapped) in the polygon or the like, which is subjected to coordinate transformation and then drawn by the GPU 52 at the time of drawing. The CLUT region and the texture region are dynamically changed in accordance with change or the like of the display region.

The image encoder/decoder 54 carries out various processing such as encoding and decoding of still images or moving images, and digital conversion and analog conversion under control of the control system 40.

The communication unit 80 controls data communication with other information processing devices including the server device 2 via the Internet 30 under the control of the control system 40.

<Main Composition of Matching Server>

Figure 4:
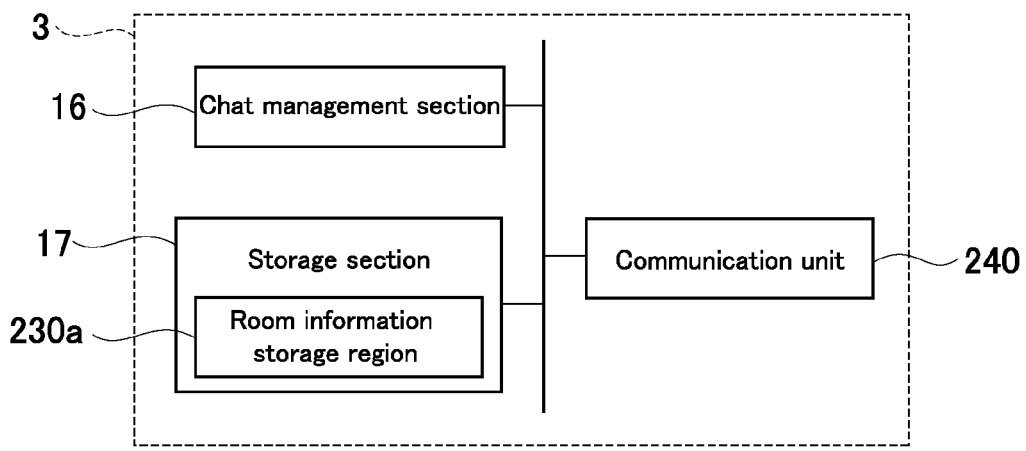
FIG. 4 is a functional block diagram illustrating a configuration of a matching server.

Next, the main part of the internal composition of the matching server 3 relating to the present invention is described while referencing FIG. 4.

The matching server 3 is constituted by a communication unit 240, a chat management unit 16, and a storage section 17, which are connected to each other via a bus. The matching server 3 executes each of the following processing (room establishment processing, entrance processing, leave processing, and chat management processing) in accordance with a chat management program stored in the storage unit 17. A room information storage region 230a is provided in the storage unit 17. The room information storage region 230a is a region for storing mutually associated room-specific information, room-specific information, user-specific information, and at least the latest chat data. The room information storage region 230a according to this embodiment is constituted by a room information registration table in which the respective pieces of information are mutually associated through registration. Note that in the case where the user-specific information included in the various information received from the client terminal device 1 is not functioning as transmission destination address information, the storage unit 17 is preset with an address table, which stores correspondences between the user-specific information and the transmission destination address information, and the matching server 3 reads out the address information corresponding to the user-specific information of the transmission destination from the address table, thereby executing the transmission processing for the client terminal device 1.

The room establishment processing is executed by the communication unit 240 receiving establish request information and setup request information from the client terminal device 1. In the room establishment processing, the chat management unit 16 establishes a chat room in accordance with the establish request information that the communication unit 240 has received. Establishment of this chat room is to set a storage region for a new chat room in the room information registration table. If a chat room is established, the room-specific information received by the communication unit 240 is registered in the above set storage region in the room information table. When registering this room-specific information, the chat management unit 16 associates the room-specific information used for identifying the generated chat room within the matching server 3 with the room-specific information and registers it, and the communication unit 240 transmits the room-specific information to the client terminal device 1 that has sent the above establish request. The client terminal device 1 that is in the chat room uses the room-specific information as the chat room address in the matching server 3.

The entrance processing is executed by the communication unit 240 receiving the enter request information from the client terminal device 1. In the entrance processing, the chat management unit 16 searches whether or not the room-specific information received by the communication unit 240 is registered in the room information registration table (judges whether or not it exists). In the case where the room-specific information is registered (case where the room-specific information has been found, the chat management unit 16 associates the user-specific information received by the communication unit 240 with the found room-specific information and registers it in the room information registration table. The client terminal device 1 enters the chat room through this registration of the user-specific information. The chat management unit 16 generates entrance completion information, and the communication unit 240 transmits the generated entrance completion information to all of the client terminal devices 1 (including the client terminal device 1 that has sent the enter request) that are associated to that chat room and registered.

Meanwhile, in the case where the room-specific information is not registered (case where the room-specific information could not be found), the chat management section 16 generates entrance failure information, and the communication section 240 transmits the generated entrance failure information to the client terminal device 1. The communication unit 240 then receives establish request information and setup request information from the client terminal device 1, and the chat management unit 16 executes the above room establishment processing.

The leave processing is executed by the communication unit 240 receiving leave request information from the client terminal device 1. In the leave processing, the chat management unit 16 finds and deletes the received user-specific information from the user-specific information associated with the room ID included in the leave request information. The client terminal device 1 leaves the chat room through this deletion of the user-specific information. The chat management unit 16 generates leave completion information, and the communication unit 240 transmits the generated leave completion information to all of the client terminal devices 1 (including the client terminal device 1 that has sent the leave request) that are associated to that chat room and registered.

Moreover, if all of the client terminal devices 1 leave the chat room (if the user-specific information associated with the registered room specify information is deleted), the chat management unit 16 deletes all of the information (the room-specific information and all data associated thereto and stored) related to that chat room (room-specific information) from the room information registration table. The chat room is deleted through deletion of all related information.

The chat management processing continues to be executed while the room-specific information is being registered in the room information registration table (while client terminal devices 1 occupying the chat room exist). In the chat management processing, if the communication unit 240 receives from the client terminal device 1 transmission data including the room-specific information corresponding to that chat room, the chat management unit 16 transmits the above transmission data to all of the client terminal devices 1, which are associated with the user-specific information associated with the room-specific information that is received by the communication unit 240 and registered. Note that the chat management unit 16 judges whether an irrelevant expression or text is included in message data included in the transmission data without transmitting the above received transmission data as is. When it is judged that an irrelevant expression or text is included, the corresponding portion may be replaced with an unrelated letter or symbol (e.g., x or the like) and transmitted to the client terminal devices 1.

<Example of Matching Server>

Figure 5:
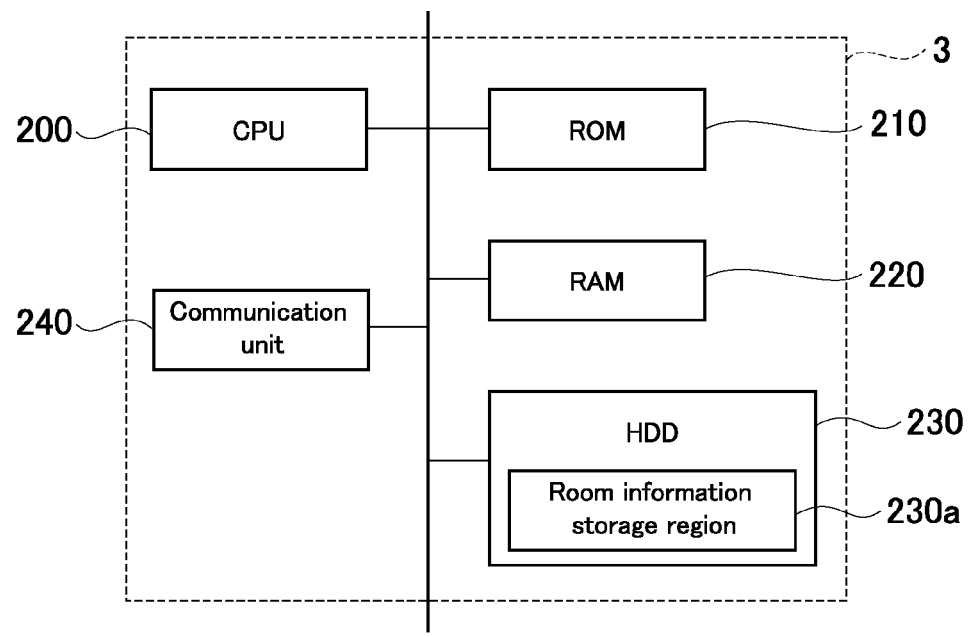
FIG. 5 is a block diagram illustrating an exemplary configuration of the matching server.

Next, an example of the matching server 3 to which the configuration of FIG. 4 is implemented is described while referencing FIG. 5.

The matching server 3 is constituted by the CPU 200, the ROM 210, the RAM 220, a hard disc drive (HDD) 230, and the communication unit 240, which are connected to each other via a bus. The CPU 200 functions as the chat execution unit 16, and the RAM 220 and the HDD 230 function as the storage unit 15.

The ROM 210 is stored with an operating system for controlling each unit of the server device 2 and various programs. The CPU 200 reads out to the RAM 210 the operating system stored in the ROM 210 at the time of activating the server device 2, and executes the read out operating system to control operations of each part of the server device 2.

The HDD 230 is stored with various types of data and various application programs such as a program (chat management program) for implementing chatting. The CPU 200 reads out to the RAM 220 the chat management program stored in the HDD 230, and runs the read out chat management program.

The communication unit 240 controls data communication over the Internet 30 under the control of the CPU 200.

<Configuration of Message Server>

Since the message server 4 has a CPU, ROM, RAM, a HDD, a communication unit, and a bus, and the basic configuration is the same as the matching server 3, description thereof is omitted.

[Operation]

Next, exemplary operations carried out in the chat system SYM are described.

The client terminal device 1 implements the various functions described in the above configuration section by turning on a power supply not illustrated in the drawing, reading out a program such as the operating system stored in the ROM 44 from the main memory 43 and executing by the CPU 41, and executing by the CPU 41 various programs read out to the main memory 43 from an optical disk loaded into the ROM 44 and the disk device 71 according to respective instructions input by the user.

The matching server 3 implements the various functions described in the above configuration section by turning on a power supply not illustrated in the drawing, and reading out to the RAM 220 various programs such as the operating system stored in the ROM 210 and executing them by the CPU 200. Note that the same holds true for the message server.

In the case of starting to chat by utilizing the chat system SYM, it is possible for the user to (1) establish a chat room and invite another user, and (2) enter a chat room invited by another person.

The following descriptions are of operations when the user A of the client terminal device 1A establishes a chat room and invites the user B of the client terminal device 1B to that chat room, and when the invited user B enters (chat participation) the chat room, where various settings are as follows. The user-specific information is the user ID. The server key (server selection basis information) a hash value calculated from a combination of the user ID and start time of the establish request information. The server ID of the matching server 3 to establish a chat room is calculated as the hash value for the server key. The room key (room-specific information) is a combination of time (start time of the above establish request processing, for example) and room ID received from the matching server 3.

<Establish Chat Room and Invite Friends>

Operations of the client terminal device 1A and the matching server 3 in the case where the user A establishes a new chat room RA are described while referencing FIGS. 6 through 9.

Figure 6:
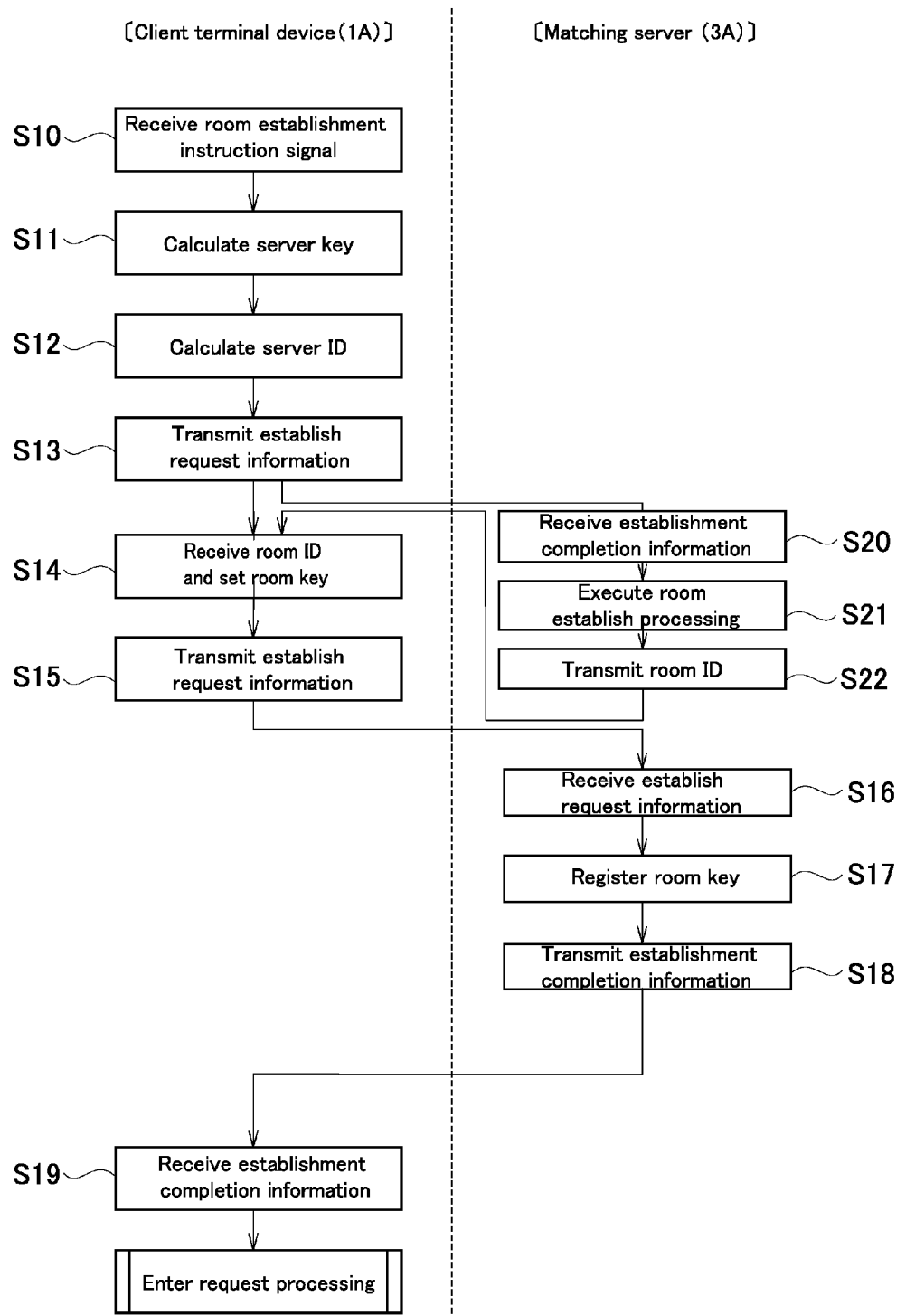
FIG. 6 is a flowchart illustrating a chat program according to the first embodiment.

As shown in FIG. 6, if the user A operates the controller 20A so as to perform a predetermined input instructing new establishment of the chat room RA, and the client terminal device 1A receives a room establishment instruction signal from the controller 20A (step S10), the client terminal device 1A starts the establish request processing.

In the establish request processing, a receipt time Ta of the room establishment instruction signal is acquired from an internal clock of the client terminal device 1A, the user ID (A) of the user A is read out from a storage unit 15A, basic data (user ID (A) Ta) is generated by concatenating the letter string of the user ID (A) and the letter string of the time Ta, and a hash value (hashA (user ID (A) Ta)) is calculated from the basic data (user ID (A) Ta) using a preset hash function (hashA) (step S11). This hash value (hashA (user ID (A) Ta))

functions as an available server key SKa for selecting randomly a matching server 3 from the multiple matching servers 3.

Next, a hash value (hashB (SKa)) of the server key SKa is calculated using a preset hash function (hashB) (step S12). This hash value (hashB (SKa)) is the server ID for the matching server 3 randomly selected from the multiple matching servers 3. In this example, the calculated server ID (A) is the server ID for the matching server 3A, where it is assumed that the matching server 3A has been selected.

Next, the establish request information including the user ID (A) is transmitted to the matching server 3A (step S13).

The matching server 3A, in response to reception of the establish request information (step S20), executes the room establishment processing (step S21). In the room establishment processing, a room ID is generated and newly registered in the room information registration table. The matching server 3A transmits the generated room ID to the client terminal device 1A (step S22). At this time, the room ID is transmitted, associated with the received establish request information so as to allow judgment that the room ID corresponds to the above establish request information on the client terminal device 1A side.

The client terminal device 1A that has received the room ID sets up a unique room key RKa to the chat room RA by combining the received room ID and time (step S15).

Next, the setup request information including the room key RKa and the room ID is transmitted to the matching server 3A (step S15).

If the matching server 3A receives the setup request information (step S16), it associates the room key RKa included in the received setup request information with the established chat room RA (room ID included in the received setup request information) and registers it in the room information registration table (step S17). As a result, establishment (the above establishment processing and registration processing) of the chat room RA in the matching server 3A is completed, the matching server 3A generates establishment completion information, associates it with the room ID, and transmits it to the client terminal device 1A (step S18).

The client terminal device 1A receives the establishment completion information, completing the establish request processing (step S19).

The client terminal device 1A executes the enter request processing following the establish request processing and enters the chat room RA. Note that details of the enter request processing are described later.

The client terminal device 1A associates the server key SKa calculated in step S11 and the room key RKa set up to each other in step S14 and then stores them in the storage unit 15. Moreover, information indicating establishment date and time of the chat room RA is associated with the room key RKa and stored.

Figure 7:
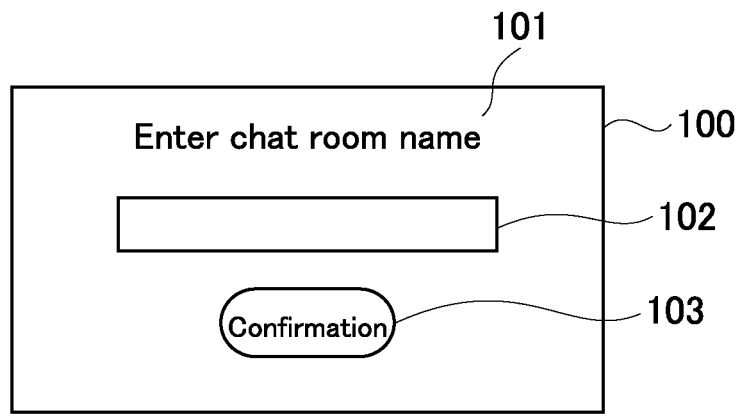
FIG. 7 is a diagram illustrating a room name input screen according to the first embodiment.

Furthermore, in the establish request processing, the client terminal device 1A displays a room name input screen 100 for the chat room RA on a monitor device 10A, as shown in FIG. 7, for example. A text 101 such as "Enter chat room name", a room name input section 102, and a confirmation icon 103 are displayed on the room name input screen 100. If the user A operates a controller 10A to set up a cursor to the room input section 102, input the room name, move the cursor to the confirmation icon 103 and press a predetermined YES button, the client terminal device 1A associates the input room name with the room key RKa and stores it. Note that if the user A sets the cursor at the confirmation icon 103 and presses a YES button without inputting the room name, the client terminal device 1A stores a default room name.

Figure 8:
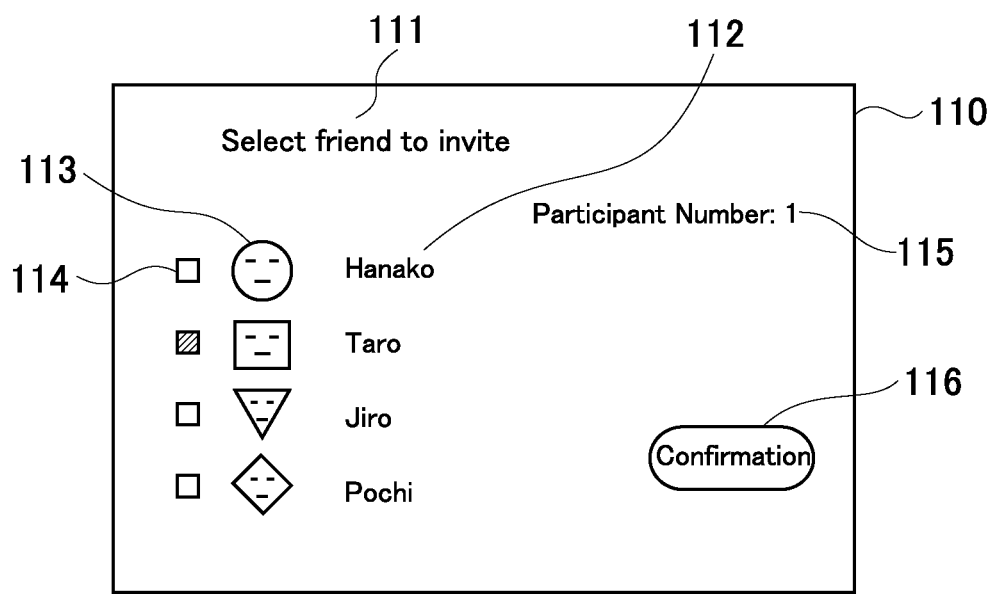
FIG. 8 is a diagram illustrating an invitation selection screen according to the first embodiment.

Once input of the room name is completed, the client terminal device 1A switches over display of the monitor device 10A from the room name input screen 100 to a guest selection screen 110, as shown in FIG. 8, for example. A text 111 such as 'Select friend to invite', a nickname (e.g., Hanako, Taro, Jiro, Pochi) 112 for each of the users registered as friends, an avatar 113 for each of the users, check boxes 114 for inputting a mark to select, a participant number display section 115 for indicating the total number of selected people, and a confirmation icon 116 are displayed on the guest selection screen 110. The nicknames 112 and the avatars 113 are read out from a friend management table in the storage unit 15A and aligned horizontally for each user. The check boxes 114 are provided one for each user, where the default is rectangular box (empty) unselected display. If the user A operates the controller 10A to move the cursor vertically, set the cursor to a desired user, and press a YES button, display of the corresponding check box 114 is switched over. In the case of unselected display, it is switched over to selected display (e.g., filled-in state), and in the case of selected display, it is switched over to unselected display. The number of users selected as guests is increased or decreased according to the select/unselect switch-over of the respective check boxes 114 and displayed in the participant number display section 115. FIG. 8 shows that only the nickname 'Taro' is selected, indicating a state where the numeral '1' in the 'participant number display section' is displayed. If the user A selects one or more users to invite to the chat room RA (changes the corresponding check box 114 to a selected mode), and sets the cursor at a confirmation icon 116 to press a YES button, an invite instruction signal is transmitted from the controller 20A to the client terminal device 1A. The client terminal device 1A that has received the invite instruction signal judges to have received an instruction to transmit an invitation, the user to be invited is confirmed, and invitation transmission processing is started. In this example, it is assumed that the user B is confirmed to be invited.

Figure 9:
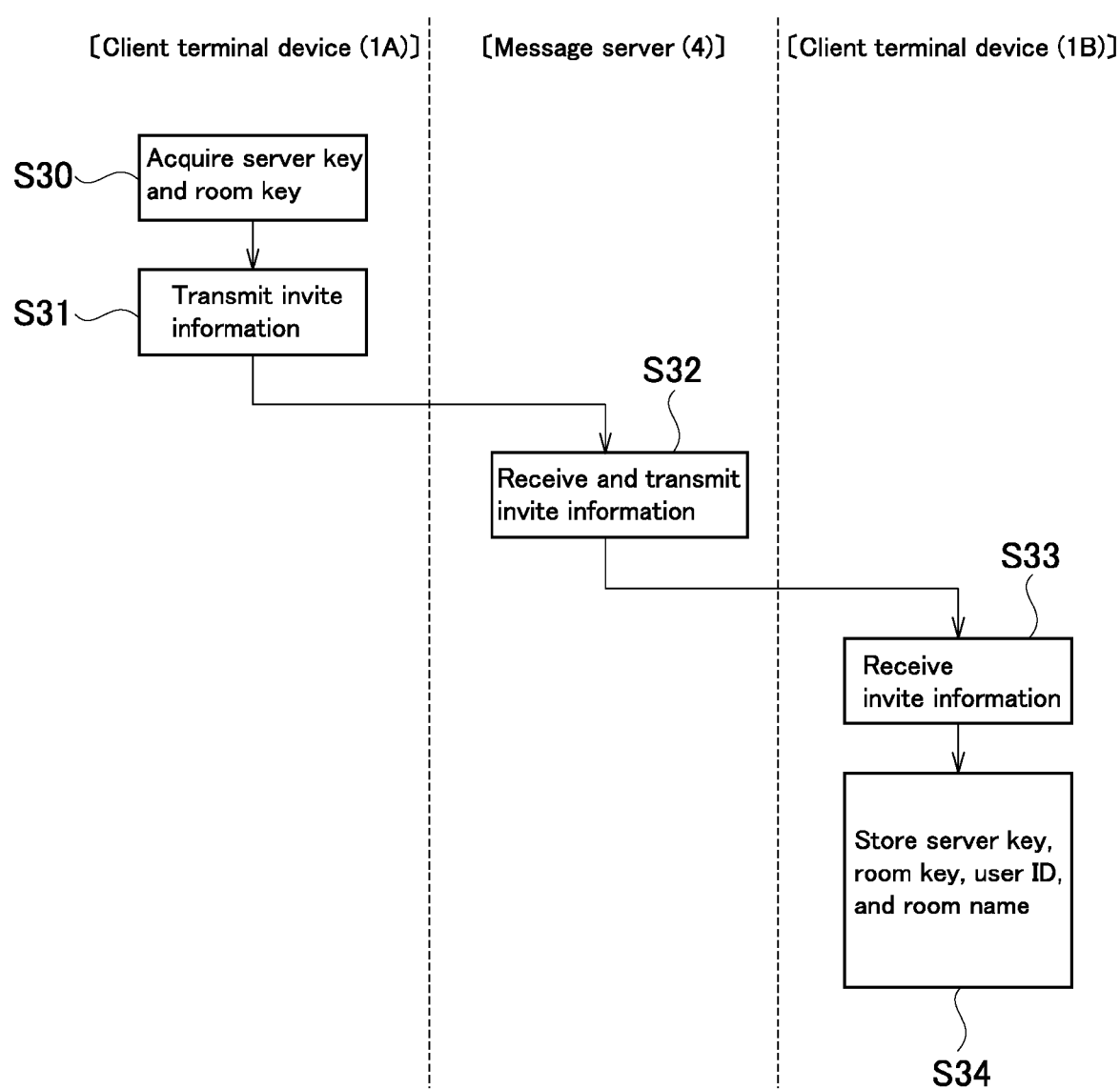
FIG. 9 is a flowchart illustrating a chat program according to the first embodiment.

Once the invitation transmission processing has started, the client terminal device 1A reads out from the storage unit 15 the sever key, the room key, and the room name associated with the chat room specified by the user A, as shown in FIG. 9 (step S30). In the invitation transmission processing at the time of chat room establishment, the chat room RA requesting establishment becomes the chat room specified by the user A, and the server key SKa (step S11 of FIG. 6), the room key RKa (step S14 of FIG. 6), and the input room name are read out.

Next, the client terminal device 1A generates invite information including message data to the effect of inviting to the chat room RA, its own user ID (A), the read out server key SKa, the room key RKa, and the room name, and then transmits to the message server 4 the generated invite information with the client terminal device 1B as a destination (step S31).

Upon reception of the invite information from the client terminal device 1A, the message server 4 transmits it to the client terminal device 1B (step S32).

The client terminal device 1B receives the invite information (step S33) and executes the invitation reception processing. In other words, the server key Ska, the room key RKa, the user ID (a), and the room name included in the received invite information are associated to each other and stored in the storage unit 15B (step S34).

<Enter Chat Room>

Figure 10:
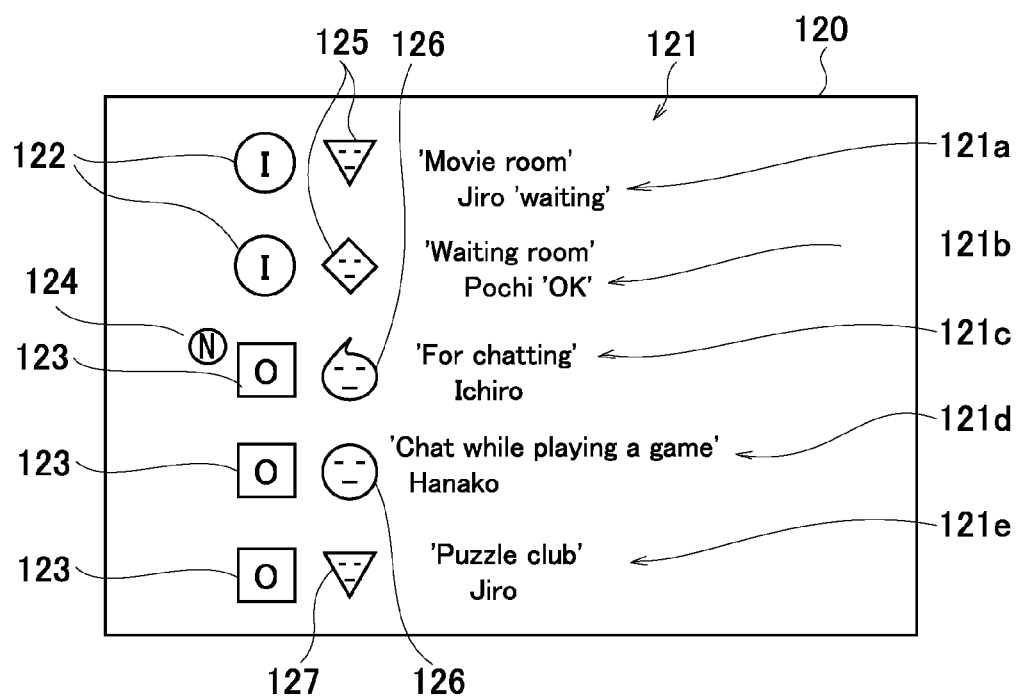
FIG. 10 is a diagram illustrating a room selection screen according to the first embodiment.
Figure 11:
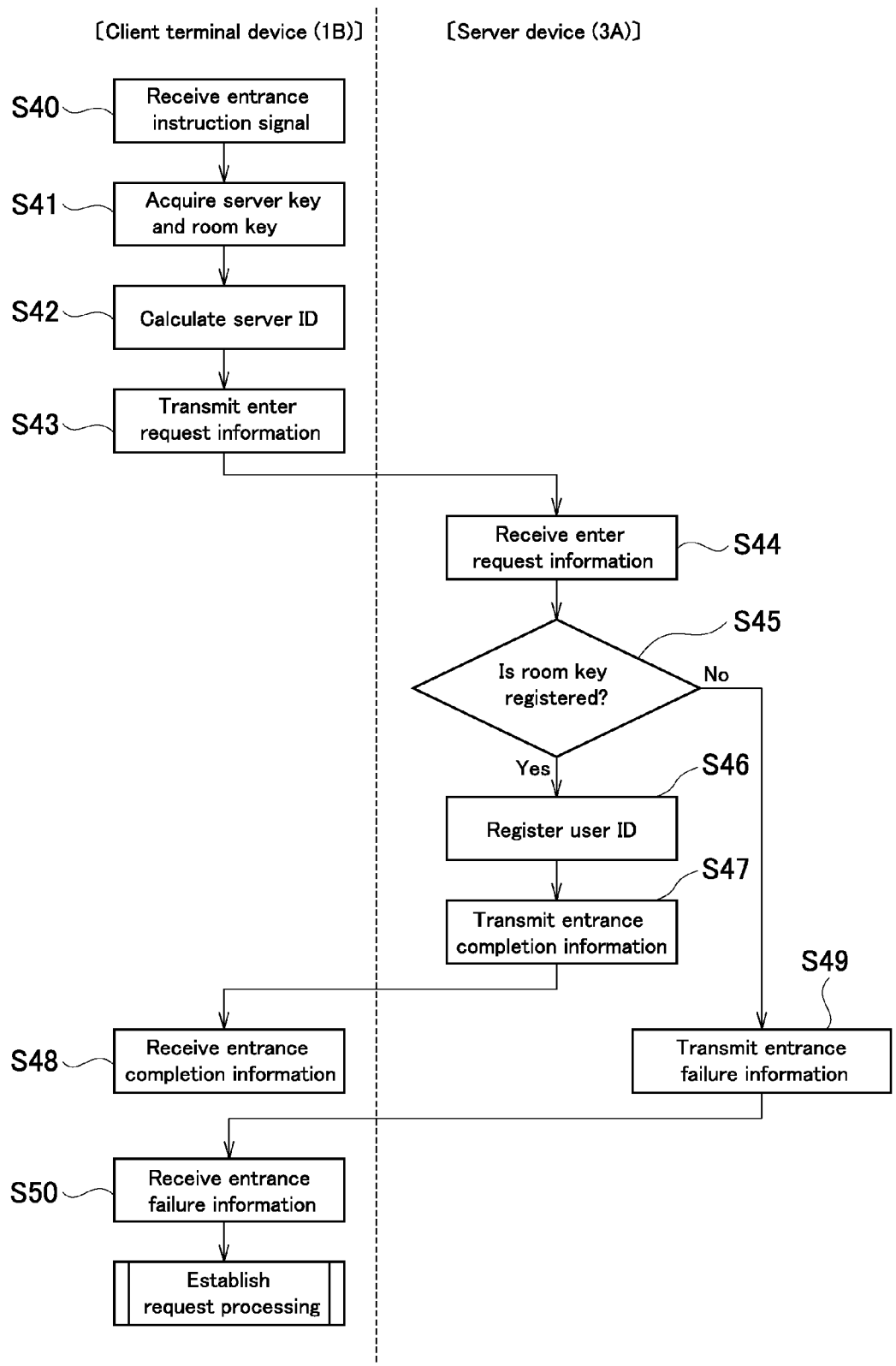
FIG. 11 is a flowchart illustrating a chat program according to the first embodiment.

Operations of the client terminal device 1B and the matching server 3 in the case where the user B enters the chat room RA are described while referencing FIGS. 10 and 11.

In the case of entering the chat room RA by invitation from the user A, the user B selects to specify the chat room RA from chat rooms it may enter, and therefore operates the controller 20B to carry out a predetermined input so as to display on the monitor device 10B the room selection screen 120 as shown in FIG. 10.

Room corresponding images 121 corresponding to chat rooms selectable by the user B are arranged vertically on the room selection screen 120. The room corresponding images 121 are classified and sorted based on room attribute information and chat history information associated with that chat room.

In the example of FIG. 10, five chat rooms may be selected, where five room corresponding images 121a to 121e are aligned vertically. The room corresponding images 121 are classified into the room corresponding images 121a and 121b of chat rooms currently occupied (participating), the room corresponding image 121c of a new chat room to which a user has been invited but has never been occupied, and the room corresponding image 121d and 121e of chat rooms which have been occupied in the past but are currently unoccupied, and are lined up in order of occupied, new, and unoccupied from top to bottom.

Each of the corresponding images 121a to 121e include a room name ('movie room', 'waiting room', 'for chatting', 'chat while playing a game', and 'puzzle club') and a nickname (Jiro, Pochi, Ichiro, Hanako, and Jiro). The room corresponding images 121a and 121b respectively include an occupied room display image 122 indicating that they are currently occupied, and the room corresponding images 121c to 121e respectively include an unoccupied room display image 123 indicating that they are currently unoccupied. In the case of the room corresponding image 121c of a new room (room to which a user has been invited by another user but have never entered therein) of the unoccupied rooms, a new display image 124 indicating that it is new is displayed, attached to the unoccupied room display image 123. Note that if these display images 122 to 124 are not limited to the above if they are displayed so as to identify whether the corresponding room is currently occupied, unoccupied and new (unentered), or unoccupied but has been previously entered.

The room corresponding images 121a and 121b respectively include an avatar 125 for the latest speaker (user from the transmission source of chat data (latest chat data) that the client terminal device 1B received last from the matching server 3), and speech content (the chat data (latest chat data) that the client terminal device 1B received last from the matching server 3) of the last speaker. In the case that the latest speaker is the user B (itself), image data of the user B's own avatar pre-registered in the storage unit 15 is read out and displayed as the avatar 125 of the latest speaker, and its own chat data (speech content of the user B) that the client terminal device 1B received last from the matching server 3 is displayed as the speech content of the latest speaker.

The room corresponding images 121c to 121e include avatars 126 and 127 for the inviter (user that has transmitted the invite information), respectively. In the case where the inviter is registered as its own (user B) friend (case where the user ID of the inviter is stored in the friend management table in the storage unit 15B), the avatar image data corresponding to the user ID of the inviter is read out from the friend management table and displayed as the avatars 126 and 127 of the inviter. In the case of an invitation to a new room from a user not registered in its own friend management table, the user information registration table in which correspondence of the user ID, the avatar image data, and the nickname of the user using the chat system SYM is preset in a storage unit (e.g., the storage section 17 of the matching server 3) on the Internet, the avatar image information and the nickname corresponding to the user ID of the inviter are obtained from the user registration table via the network and displayed as the avatar 26 and the nickname of the inviter. In the case of a room established by itself (user B), the avatar and the nickname of the user B are displayed as the avatar 127 and the nickname of the inviter. Note that the once set correspondence of the user ID, the avatar image data, and the nickname is stored in the storage unit 15B for the chat screen display processing.

Moreover, the latest speech time and date is displayed when the cursor is pointed at the room corresponding images 121a and 121b, the received time and date in the invite information is displayed when the cursor is pointed at the room corresponding images 121c and 121d, and the last leave time and date is displayed when the cursor is pointed at the room corresponding image 121e.

The user B selects the desired one of the room corresponding images 121 displayed on the room selection screen 120 and moves the cursor to the selected room corresponding image 121 to press a YES button, thereby confirming selection of the chat room and transmitting an entrance display signal from the controller 20B to the client terminal device 1B. In this example, it is assumed that the chat room RA has been selected.

As shown in FIG. 11, the client terminal device 1B starts the enter request processing by receiving the entrance display signal (step S40), reads out from the storage unit 15B the server key Ska and the room key RKa corresponding to the chat room RA (step S41), and as in the case of the above establish request processing (step S12 of FIG. 6), calculates a server ID using the server key SKa, and specifies the matching server 3 requesting entrance (step S42). In this case, since the server key SKa is used, the server ID (A) is calculated, as in step S12 of FIG. 6.

The client terminal device 1B then generates enter request information including its own user ID (B) and the room key RKa, and transmits it to the matching server 3A corresponding to the server ID (A) (step S43).

The matching server 3A starts the entrance processing by receiving the enter request information (step S44). In the entrance processing, whether or not the room key RKa included in the received enter request information is registered in the room information registration table is judged (step S45).

When it is judged to be registered (when the room key RKa is found), since the entrance processing is executable, the user ID (B) is associated with the room key RKa and registered in the room information registration table (step S46). The client terminal device 1B is entered into the chat room RA through registration of the user ID (B), and entrance completion information is transmitted to all of the client terminal devices 1 (including the client terminal device 1B) associated with the chat room Ra and registered (step S47).

The client terminal device 1B receives its own entrance completion information, completing the enter request processing (step S48).

Meanwhile, when the room key RKa is judged in step S45 to not be registered (when the room key RKa could not be found) for the reason that the chat room RA has already been deleted or similar reason, entrance failure information is transmitted to the client terminal device 1B (step S49).

The client terminal device 1B that has received the entrance failure information proceeds to the above establish request processing. In other words, the establish request information including its own user ID (B) and the establish request information including the room key RKa of the chat room RA and its own user ID (B) are transmitted to the matching server 3A. As a result, the chat room RA is established in the matching server 3A and the client terminal device 1B enters that chat room RA.

The chat execution processing continues to be executed for the chat room RA while the client terminal device 1B is entered in the chat room RA (from the end of the enter request processing to the end of the leave request processing). The client terminal device 1B generates chat data based on an operation signal from the controller 20B, generates transmission data including the generated chat data and the user ID (B) in response to a transmission instruction from the user via the controller 20B, and transmits the generated transmission data to the chat room RA in the matching server 3A.

In addition, the client terminal device 1B receives from the matching server 3 entrance completion information of another person indicating that another client terminal device 1 has entered the chat room RA and leave completion information of the other person indicating that the other client terminal device 1 has left the chat room RA, or chat data (reception chat data) transmitted from the matching server 3A and reception data including the user IDs of the client terminal devices 1 indicating the respective operating users. The client terminal device 1B associates as chat history information the received entrance completion information of the other person, the leave completion information of the other person, received message information indicating the received chat data, and user IDs corresponding thereto with the room-specific information and stores them. The entrance completion information of the other person, the leave completion information of the other person, and the received message information to be stored respectively include information indicating time and date of reception thereof.

Figure 12:
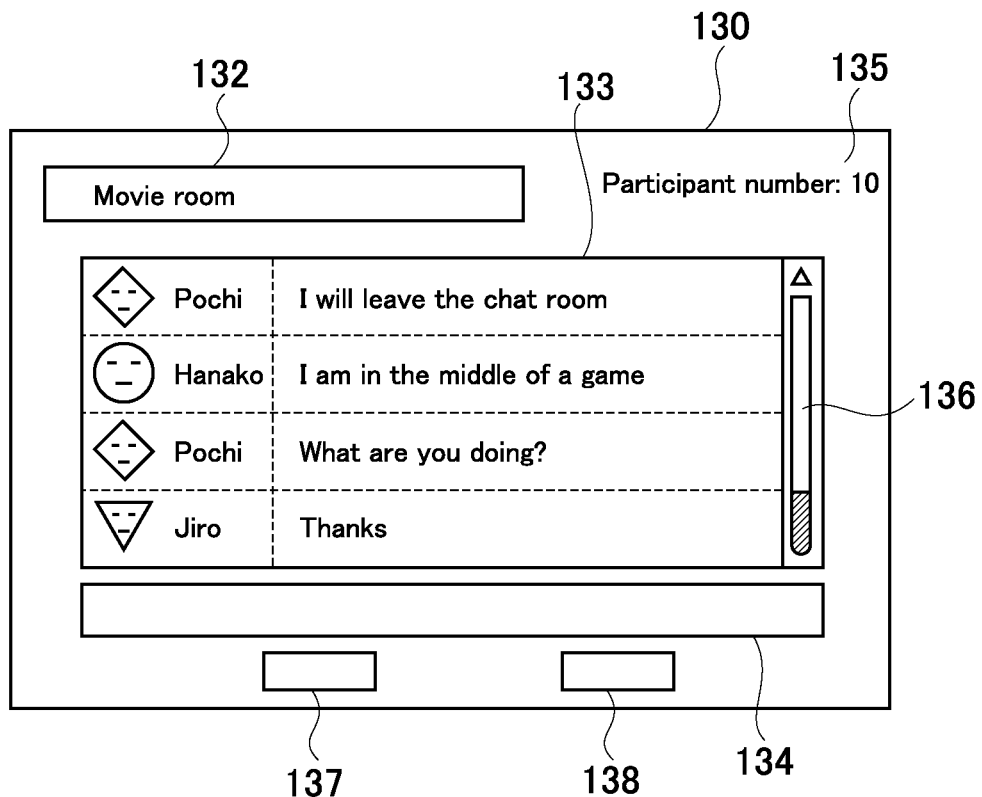
FIG. 12 is a diagram illustrating a chat screen according to the first embodiment.

Moreover, the client terminal device 1B that is in the chat room RA executes the chat screen display processing while the user B, for example, is chatting, and displays a chat screen 130 as shown in FIG. 12 on the monitor device 10B.

A part of information including the latest information (information of the latest time and date) of the chat history information associated with the chat room RA and stored, and a part of information including at least room name of the room attribute information are displayed on the chat screen 130. The chat history information is displayed in a time series from the latest information.

The chat screen 130 of the example shown in FIG. 12 includes a room name display section 132 in which a room name (movie room) is displayed, a speech display section 133 in which an avatar, a nickname, and speech content (received chat data) of a speaker (user who transmitted chat data) are displayed lined up in a time series based on spoken time (reception time), a speech input section 134 in which the user B writes speech (inputs chat data), a participant number display section 135 indicating number of users in the room, a scroll bar 136 for scrolling in the speech display section 133, a friend list display icon 137, and a participant list display icon 138.

When the cursor is moved to the friend list display icon 137 and a YES button is pressed, another user may be invited to that chat room by displaying the same screen as the inviter selection screen 110 shown in FIG. 8 and performing a predetermined operation input. Moreover, when the cursor is moved to the participant list display icon 138 and a YES button is pressed, a list (e.g., list of nicknames and avatars) of all of the users that are in (participating) the chat room is displayed.

The chat screen 130 is switched over between display state and non-display state in compliance with an instruction from the user via the controller 20, where when the non-display state is instructed, the chat screen display processing is temporarily interrupted so that the chat screen 130 is not displayed.

If room attribute information of the entered chat room is added (if room attribute information is associated with the room-specific information and newly stored) when the chat screen 130 is set to the non-display state and another screen is displayed (for example, when a game is in session and a game screen thereof is displayed), a chat information report screen reporting the added room attribute information is displayed, overriding the game screen.

Figure 13:
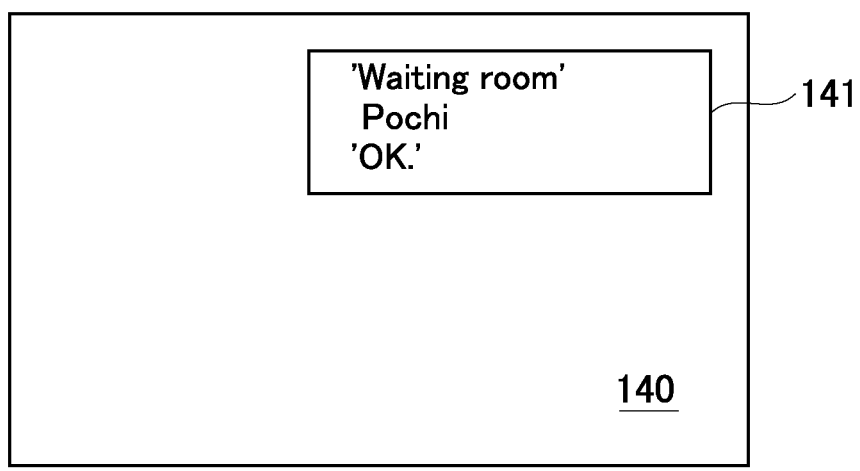
FIG. 13 is a diagram illustrating a chat information report screen according to the first embodiment.

For example, as shown in FIG. 13, when a chat room with the room name 'Waiting Room' is entered, the chat screen is set to non-display state, and a game screen 140 is displayed, and a player with the nickname 'Pochi' says 'OK' for the 'Waiting Room' (when message data of 'OK' is associated with the user ID corresponding to the player with the nickname 'Pochi' and received), information thereof is displayed on the chat information report screen 141. Moreover, when the player with the nickname 'Hanako' enters the 'Waiting room', the chat information report screen including a text of 'Hanako is participating in the Waiting Room' is displayed. Note that range and position of displaying the chat information report screen 141 is preferably the smallest area near the rim of the game image 140 so as not to interfere with execution of the game.

<Leave Chat Room>

Operations of the client terminal device 1B and the matching server 3 in the case where the user B leaves the chat room RA are described next.

If the user B specifies the chat room RA and instructs to leave by operating the controller 20B, the client terminal device 1B receives a leave instruction signal from the controller 20B and starts the leave request processing. In the leave request processing, leave request information including the user ID (B) and the server ID is transmitted to the matching server 3A.

The matching server 3A that has received the leave request information starts the leave processing. In the leave processing, the matching server 3A finds and deletes the received user ID (B) from the user IDs associated with the room ID included in the received leave request information and registered. The client terminal device 1B leaves the chat room RA through this deletion of the user ID (B). The matching server 3A transmits the leave completion information to all of the client terminal devices 1 (including the client terminal device 1B that has sent the leave request) that are associated to the chat room RA and registered.

Moreover, if all of the client terminal devices 1 leaves the chat room RA (if all of the user IDs associated with the registered room specify information are deleted), the matching server 3A deletes all of the information (the room key RKa and all data associated thereto and stored) related to the chat room RA from the room information registration table. The chat room RA is deleted through deletion of all related information.

The leave request processing for the client terminal device 1B is completed upon reception of the leave completion information for itself from the matching server 3.

As described above, each of the matching servers 3 removes the established chat room when all of the client terminal devices 1 have left the chat room. In addition, each of the matching servers 3 re-establishes that chat room upon reception of an enter request from a client terminal device 1 for a chat room that has already been removed.

In other words, each of the matching servers 3 only has active chat rooms in which one or more client terminal devices 1 have entered, and has no inactive chat rooms in which no client terminal devices 1 have entered.

As a result, required storage capacity of the storage unit 15 may be kept to a minimum without reducing remaining capacity of the storage unit 15 in the matching server 3 due to existence of inactive chat rooms, whereby the storage unit 15 may be effectively used.

In the case where the a chat room is deleted when the client terminal device 1 has requested entering the chat room, without any report of the deletion of the chat room to the user, the client terminal device 1 executes the establish request processing following the enter request processing, establishes a chat room in the matching server 3 and enters it. Accordingly, there is no unpleasantness for the user using the chat system SYM.

Each of the client terminal devices 1 that have left the chat room calculates the server ID of the matching server 3 in which the chat room exists, wherein the server ID and the hash function used for that calculation are the same for each of the client terminal devices 1. Moreover, the hash function is set such that the multiple matching servers 3 are selected randomly and is appropriately updated in accordance with increase and decrease in the number of matching servers 3. In other words, even in the case where the matching servers 3 are increased, the above hash function is updated, and the server IDs to be calculated are changed while all of the client terminal devices 1 have left the chat room, the server IDs calculated by the respective client terminal devices 1 are changed so as to correspond to the same matching server 3. As a result, distribution of server load after increase in the matching servers 3 may be carried out effectively.

When starting chat (when entering a chat room), the room selection screen 120 is displayed on the monitor device 10. The room corresponding images 121 indicating selectable chat rooms are displayed in a line on the room selection screen 120, and each of the room corresponding images 121 includes at least one piece of information of the chat history information and the room attribute information associated with each of the chat rooms and stored. This allows the user to easily grasp the content of each of the available chat rooms so as to enter a desired chat room.

The user may manage its own available chat rooms in an integrated fashion by the client terminal device 1.

When the user enters the chat room and executes chat, the chat screen 130 corresponding to that chat room is displayed on the monitor device 10. A part of information including the latest information of the chat history information associated with that chat room, and a part of information including at least room name of the room attribute information are displayed on the chat screen 130. This allows the users of the chat system SYM to chat with the same sensibility as in the case where the server device stores all of the chat history information and manages it in an integrated manner, and each of the client terminal devices receives the chat history information from the server device and display it.

In the case where another client terminal device 1 has entered or left the chat room in use, or case where chat data has been transmitted from another client terminal device 1 when the chat screen 130 is switched over between display state and non-display state in response to an instruction from the user, and is in a non-display state and another screen (e.g., the game screen 140) is displayed, a chat information report screen 141 reporting thereof is displayed overriding the other screen (the game screen 140). This allows chatting easily with another user while executing another processing for a game or the like.

Note that in this embodiment, while the matching servers 3 establish a chat room under a condition that a chat room establish request is accepted from the client terminal device 1 in the case where the client terminal device 1 has requested entrance to a chat room not existing in the matching servers 3, a chat room may also be established under a condition that it is judged not existing in the matching servers 3 as a starting condition.

Next, a second embodiment of the present invention will be described. This embodiment applies the chat system SYM according to the first embodiment to executable system voice chat in parallel with text chat and voice chat, and a part or all of the chat rooms of the first embodiment are set as chat rooms for system voice chat (system voice chat rooms). In other words, the chat system SYM of this embodiment is the same as that in the first embodiment aside from transmitting and receiving chat data in the same manner as the voice data and the text data. Note that the common configuration with the first embodiment is given the same reference numerals, and description thereof is omitted. Moreover, a case where some of the chat rooms of the first embodiment are set as system voice chat rooms is described forthwith. Furthermore, the number of people allowed entering a system voice chat room may be limited to a small number, where a case of limiting the allowed maximum number of people allowed to enter a system voice chat room to four is described below.

With a client terminal device 1 performing system voice chat, a sound system 60 generates chat data (voice chat data) based on a voice signal input from the microphone 12 and transmits the generated chat data to the communication unit 80. Moreover, the sound system 60 decodes the chat data (voice chat data) obtained by the communication unit 80 over the Internet 30 through voice codec, converts it to analog data to generate waveform data, records it on the sound buffer 62, and then outputs it as voice from the speaker 63. In other words, the sound system 60 functions as the chat execution unit 13.

When the matching server 3 receives setup request information from the client terminal device 1, as in the first embodiment, that client terminal device 1 and a chat room are associated to each other and registered in the storage section 17. Moreover, once enter request information is received from the client terminal device 1, it is judged whether the chat room specified by the received enter request information is registered in the storage section 17. In the case where the chat room is registered in the storage section 17, the client terminal device 1 is associated with the chat room and registered in the storage section 17. On the other hand, in the case where the chat room is not registered in the storage section 17, the client terminal device 1 and the chat room are associated to each other and registered in the storage section 17. The matching servers 3 may differentiate and register chat rooms for text chat (text chat rooms) and chat rooms for system voice chat (system voice chat rooms), or may register them without differentiating them from each other.

The matching server 3 controls execution of text chat through transmission and reception of message data (text chat data) among multiple client terminal devices 1 associated and registered to one text chat room. Moreover, the matching server 3 controls execution of text chat through transmission and reception of message data and execution of voice chat through transmission and reception of voice data (voice chat data) among multiple client terminal devices 1 associated and registered to one system voice chat room.

Next, a screen displayed on the monitor device 10A when the user A establishes a system voice chat room SVRA, a screen displayed on the monitor device 10B when the user B enters (participates in chatting) a desired chat room, and a chat screen during system voice chat are described.

Figure 14:
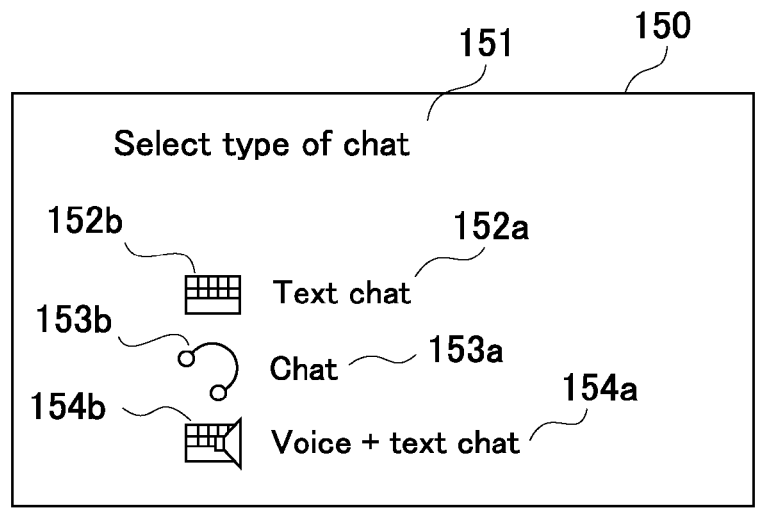
FIG. 14 is a diagram illustrating a chat selection screen according to a second embodiment.

In the case of newly establishing a chat room, the user A operates the controller 20A to perform a predetermined input for instructing new establishment of a chat room. The establish request processing starts once the client terminal device 1A receives the establishment completion information. In the establish request processing, the client terminal device 1A displays on the monitor device 10A the selection request screen 150 on which selectable chat types are listed, as shown in FIG. 14. A text 151 such as "Select chat type" and the selectable chat types are displayed on the selection request screen 150. In this example, text chat (chat in the first embodiment), AV chat, and system voice chat (chat in this embodiment) may be selected, and characters 152a of 'text chat' and an icon 152b corresponding to text chat, characters 153a of 'chat' and an icon 153b corresponding to AV chat, and characters 154a of 'voice+text chat' and an icon 154b corresponding to system voice chat are displayed vertically lined up. Note that AV chat is chat using images and voice. If the user A operates the controller 10A to set the cursor at the characters 154a and press a predetermined YES button, the client terminal device 1A recognizes that establishment of a system voice chat room has been requested and stores that information, transmitting the establish request information to the matching server 3.

Once the user A selects a chat type, the client terminal device 1A displays the room name input screen 100 and the guest selection screen 110 on the monitor device 10A, as in the first embodiment. Next, if the user A selects and confirms on the guest selection screen 110 the user B as the user to invite to the system voice chat room SVRA, the client terminal device 1A generates invite information including message data indicating to the effect of an invitation to the system voice chat room, its own user ID, and the read out server key SKa, the room key RKa, and the room name, and then transmits the generated invite information to the message server 4 with the client terminal device 1B as a destination. The message server 4 that has received the invite information from the client terminal device 1A transmits this invite information to the client terminal device 1B. The client terminal device 1B that has received the invite information appropriately displays on the monitor device 10B an image indicating to the effect that an invitation to the chat room has been received (e.g., text such as 'You are invited to the system voice chat room by A').

Figure 15:
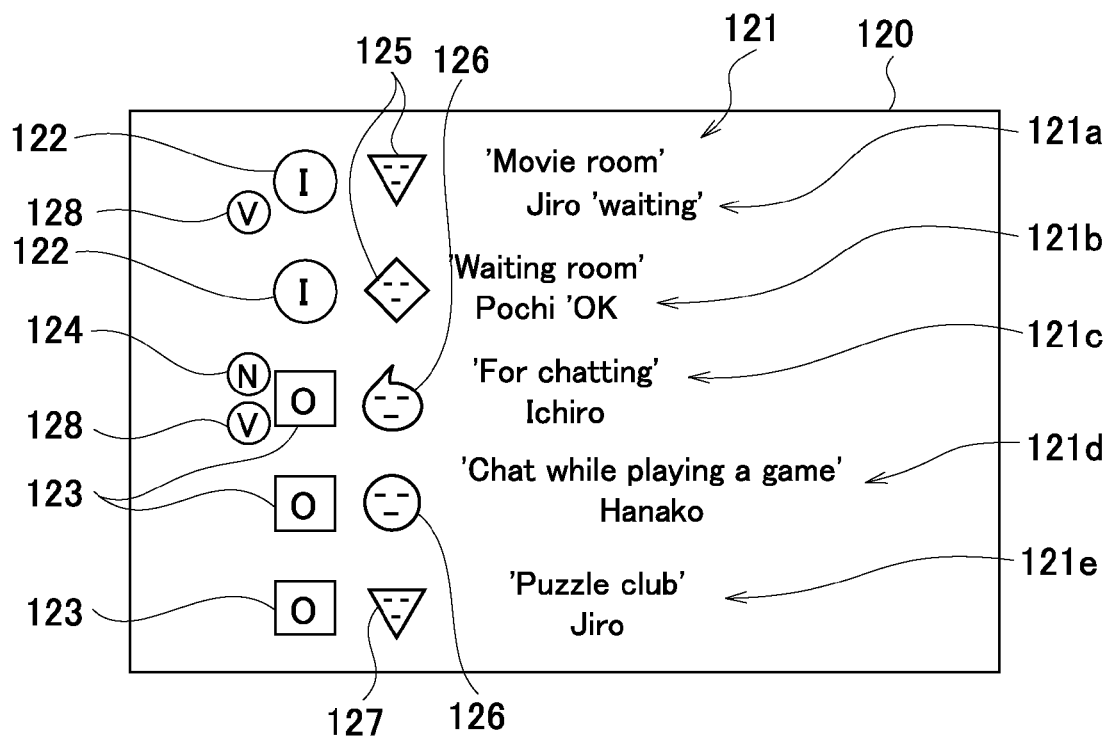
FIG. 15 is a diagram illustrating a room selection screen according to the second embodiment.

The user B who wants to enter the chat room (text chat room or system voice chat room) operates the controller 20B, as in the first embodiment, to carry out a predetermined input so as to display on the monitor device 10B the room selection screen 120 as shown in FIG. 15. The room selection screen 120 of FIG. 15 is the same as the room selection screen 120 of FIG. 10 aside from the room corresponding images 121 of the system voice chat room including system voice display images 128 indicating that it is a system voice chat room. In the example of FIG. 15, two of the five selectable chat rooms are system voice chat rooms, where the room corresponding images 121a and 121c respectively include the system voice display image 128. The user B moves the cursor to the room corresponding image 121c to press a YES button, thereby allowing entrance to the corresponding system voice chat room and execute system voice chat.

When the room selection screen 120 is updated at every predetermined time or when new text chat data is received, and the user B is in multiple chat rooms at that update time, the latest speech times and dates (time and date of registration of last registered own or other user's text chat data) for the respective occupied chat rooms are aligned and sorted in reverse chronological order. Note that when the occupied chat rooms include a system voice chat room, display order of the entered chat rooms is determined according to only the times and dates of registration of the text chat data, not reflecting times and dates of transmission and reception of the voice chat data.

Figure 16:
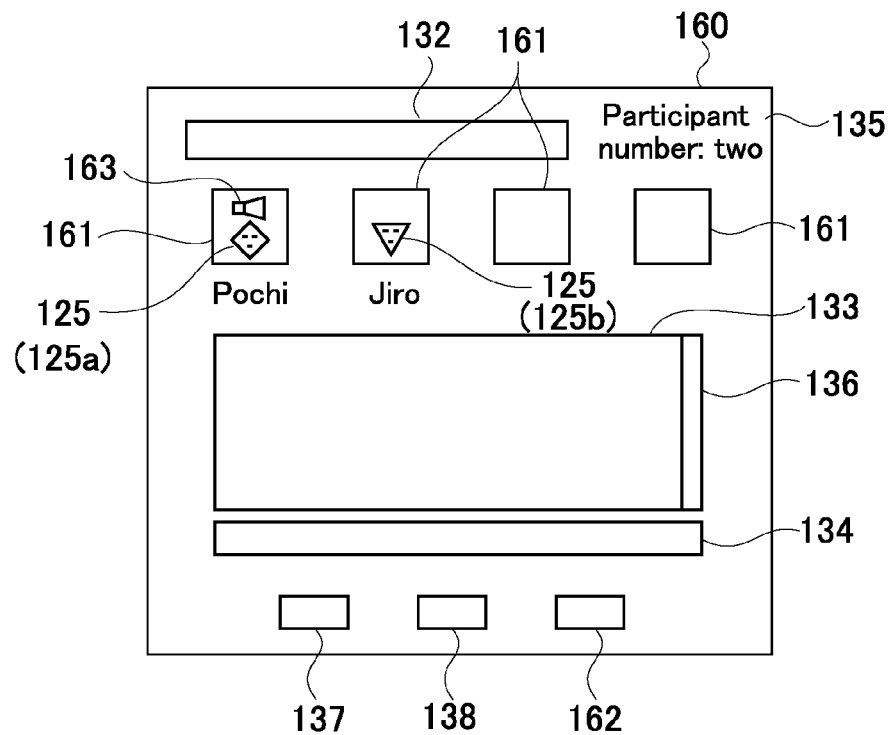
FIG. 16 is a diagram illustrating a chat screen according to the second embodiment.

The client terminal device 1B executing system voice chat displays on the monitor device 10B the chat screen 160 corresponding to the occupied system voice chat room. The chat screen 160 displays participant display sections 161, a voice chat setup icon 162, and as in the first embodiment, the room name display section 132, the speech display section 133, the speech input section 134, the participant number display section 135, the scroll bar 136, the friend list display icon 137, and the participant list display icon 138. The participant display sections 161 display the maximum number of people (four people in this embodiment) that may enter the system voice chat room simultaneously, and each of the participant display sections 161 displays an avatar 125 for a participant entered in the system voice chat room. The avatars 125 displayed in the participant display sections 161 include it's own (user B) avatar 121a and another person's avatar 125b. Moreover, in the case where the participants have not reached the maximum number, an avatar 125 is not displayed in a part (two places in the example of FIG. 16) of the participant display sections 161. Below the participant display sections 161 in which the avatars 125 are displayed, the nicknames of those participants (its own (user B) nickname 'Pochi' and the nickname 'Jiro' of another person in the example of FIG. 16) are displayed. Furthermore, a speaker icon 163 specifying a speaker who is making sounds is displayed in the participant display sections 161. The user B may recognize who's speech is being output from the speaker 63 by looking at the speaker icon 163. Note that the voice chat setup icon 162 is an icon selected when performing a setup operation for a voice changer function, a setup operation for an audio apparatus, an on/off operation for the microphone 12, or volume adjustment for the speaker 63.

According to this embodiment, the users participating in the system voice chat room may each freely select and executing text chat and voice chat.

Moreover, since selection of text chat and voice chat is optional, the users participating in the system voice chat room may continue conversation by text chat in the same system voice chat room when load of the client terminal device 1 and the network 30 by voice chat (voice chat data) is excessive, making it difficult for the conversation to progress by voice chat.

<Modification 1>

There is a case where the user A and the user B participating in the system voice chat according to the second embodiment desire to participate as teammates of the same group in a network competition game. This example easily meets the requests of the above users by referencing a chat participant list and a game participant list in the respective client terminal devices 1.

The client terminal device 1A of the user A and the client terminal device 1B of the user B may execute the same network competition game, where this competition game is a game played by multiple groups competing against each other (hereafter referred to as competition game).

Figure 17:
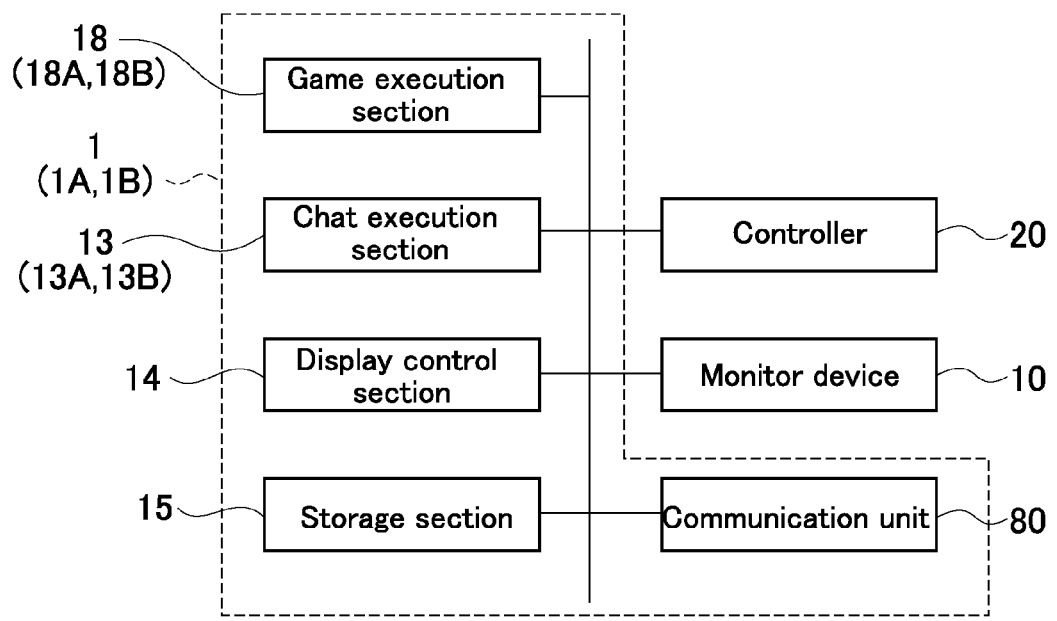
FIG. 17 is a functional block diagram illustrating a configuration of a client terminal device according to a modification.

The client terminal device 1 is constituted by the communication section 80, the chat execution section 13, the display control section 14, the storage section 15, and a game execution section 18, which are connected to each other via a bus, as shown in FIG. 17. The game execution section 18 executes game processing in accordance with a game program stored in the storage section 15. Note that the CPU 41 (see FIG. 3) functions as the game execution section.

A case where the user A and the user B participate in the same system voice chat room, and the user B (client terminal device 1B) participates later in the same competition game that the user A (client terminal device 1A) is participating in is described below.

If a game execution section 18B of the client terminal device 1B activates the competition game, the game execution section 18B acquires as a game participant list, information of groups already set up in the competition game and information of users belonging to each of the groups via the Internet 30. Providers of the game participant list are a server device, which manages progression of the competition game, for example, and another client terminal device 1 already participating in the competition game. The game execution section 18B that has received the game participant list may acknowledge that the user A belongs to a predetermined group (Group X).

The game execution section 18B that detects whether the chat execution section 13B is activated (executing processing) at a predetermined time ranging from activation of the competition game to determination of which group of the competition game it belongs. When it is detected that the chat execution section 13B is activated, the game execution section 18B requests to the chat execution section 13B provision of a list (chat participant list) of users (user-specific information (user IDs)) participating in the system voice chat.

The chat execution section 13B that has received from the game execution section 18B the provision request for a chat participant list judges whether there exists system voice chat in which the user B is currently participating, and in the case where a participating system voice chat exists, a chat participant list is provided to the game execution section 18B. On the other hand, in the case where a system voice chat in which the user B is currently participating does not exist, the chat execution section 13B reports to the game execution section 18B to the effect that a chat participant list does not exist.

The game execution section 18B that has received provision of the chat participant list refers to the game participant list and the chat participant list so as to judge whether there is any user overlapping on both lists. In this example, the user A is judged to be a user overlapping on both lists. In the case where there is an overlapping user, when displaying on the monitor device 10B a screen for requesting the user B to select whether or not to join any one of the groups and participate in the game, the game execution section 18B displays an image reporting to which group the user overlapping on both lists belongs (image reporting that the user A belongs to Group X). The user B who sees this image may easily join the same group as user A by selecting to join Group X.

In this manner, according to Modification 1, the user A and the user B participating in the system voice chat may easily participate as teammates of the same group in the network competition game. Specifically, in the case where a nickname (chat nickname) used by the user A for participating in the system voice chat and a nickname (game nickname) used by the user A for participation in the competition game differ, the user A is displayed using the chat nickname in an image reporting that the user A belongs to Group X. As a result, the user B may easily and surely recognize the group to which the user A belongs and join the same group.

<Modification 2>

In the above Modification 1, in the case where the user A and the user B participating in the same chat room participate in the competition game while belonging to different groups, there is a chance of a user performing an action (namely, cheating) for providing undisclosed information regarding the game of the group to another user. Cheating is easily carried out particularly during a conversation by voice in the system voice chat. In order to prevent such cheating in this example, the user A and the user B who participate in the system voice chat avoid from participating in the competition game while belonging to different groups.

There are two aspects of the user A and the user B who participate in the same system voice chat further participating in the competition game while belonging to different groups: a case (first case) where the user B participates in a competition game in which the user A is already participating, and thus belongs to a different group than the user A in a state where the user A and the user B are participating in the same system chat room, and a case (second case) where the user B participates in a competition game in which the user A is already participating in a state where the user A and the user B are participating in the same system chat room while belonging to different groups.

Corresponding to the above first case, in this example, as in Modification 1, the game execution section 18B detects whether the chat execution section 13B is activated at a predetermined time ranging from activation of the competition game to determination of which group of the competition game it belongs. When it is detected that the chat execution section 13B is activated, the game execution section 18B requests to the chat execution section 13B provision of a chat participant list for the system voice chat.

The chat execution section 13B that has received from the game execution section 18B the provision request for a chat participant list judges whether there exists system voice chat in which the user B is currently participating, and in the case where a participating system voice chat exists, a chat participant list is provided to the game execution section 18B. On the other hand, in the case where a system voice chat in which the user B is currently participating does not exist, the chat execution section 13B reports to the game execution section 18B to the effect that a chat participant list does not exist.

The game execution section 18B that has received provision of the chat participant list refers to the game participant list and the chat participant list so as to judge whether there is any user overlapping on both lists. In this example, the user A is judged to be a user overlapping on both lists. In the case where there is an overlapping user, when displaying on the monitor device 10B a screen for requesting the user B to select whether or not to join any one of the groups and participate in the game, a selection screen for making the user B select whether or not to leave the system voice chat room in which the overlapping user (user A) is participating is displayed on the monitor device 10B. This selection screen includes a text specifying an overlapping user and groups to which the user belongs, such as 'Since user A belongs to Group X, only Group X can be selected.' When the user B has selected to leave the system voice chat room in which the user A is participating, the chat execution section 13B executes processing to leave the system voice chat room, the game execution section 18B displays on the monitor device 10B all of the groups including Group X as available groups, and the user B arbitrarily selects a group that it wants to join from all of the groups. Meanwhile, when the user B has selected not to leave the system voice chat room in which the user A is participating, the game execution section 18B displays on the monitor device 10B only Group X as an available group, and selection of only Group X is permitted to the user B.

Accordingly, in the case where the user B participates in the competition game in which the user A is already participating in a state where the user A and the user B are participating in the same system chat room, the user B may participate in the competition game while belonging to a different group than the user A under a condition of leaving the system voice chat room in which the user A is participating, and the user B may continue to participate in the system voice chat room in which the user A is participating under a condition of participating in the competition game while belonging to the same group to which the user A belongs.

Moreover, corresponding to the above second case, the chat execution unit 13B detects whether the game execution section 18B is activated while having left a chat room or participating in a new chat room. When it is detected that the game execution section 18B is activated, the chat execution section 13B reports to the effect of participation in chat to the game execution section 18B. The game execution section 18B that has received the report of participation in chat judges whether the game being executed is a competition game, and in the case of a competition game, requests the chat execution section 13B to provide a list of users (chat participant list) participating in the system voice chat.

The chat execution section 13B that has received from the game execution section 18B the provision request for a chat participant list judges whether there exists system voice chat in which the user B is currently participating, and in the case where a participating system voice chat exists, a chat participant list is provided to the game execution section 18B. On the other hand, in the case where a system voice chat in which the user B is currently participating does not exist, the chat execution section 13B reports the game execution section 18B to the effect that a user participant list does not exist.

The game execution section 18B that has received the chat participant list refers to the already acquired game participant list and the chat participant list so as to judge whether another user (user other than the user B) overlapping on both lists exists and that overlapping user belongs to another group than the group to which the user B belongs. In this example, the user A is judged to be a user overlapping on both lists, and it is judged that the user A belongs to another group (Group X) than the group (Group Y) to which the user B belongs. In the case where an overlapping user does not exist, and case where all of the overlapping users belong to the group to which the user B belongs, the game execution unit 18 continues the game processing without interruption. On the other hand, in the case where another overlapping user belongs to another group than the group to which the user B belongs (case where the user A belongs to Group X and the user B belongs to Group Y), the game execution section 18 temporarily interrupts the game processing, and displays on the monitor device 10B a selection screen for the user to select either termination of the game or leaving from the system voice chat room in which another overlapping user (user A) is participating. If the user B selects termination of the game, the game execution section 18 terminates the interrupted game processing. Moreover, if the user selects to leave the system voice chat room, the chat execution section 13B executes the processing for leaving the system voice chat room, and the game execution section 18B restarts the interrupted game processing.

Accordingly, in the case where the user B participates in the system voice chat room in which the user A is already participating in a state where the user A and the user B are participating in the same competition game while belonging to different groups, the user B may continue to participate in the competition game in progress under a condition of not participating in the system voice chat room in which the user A is participating, and may participate in the system voice chat room in which the user A is participating under a condition of terminating the competition game.

Note that in the above example, in the case where the user A and the user B participate in the same system chat room and the user B participates in the competition game in which the user A is already participating and belonging to Group X, while the user B is inquired whether it will leave the system voice chat room in which the user A is participating, or participate in the competition game while belonging to another group than Group X, without conducting this inquiry, the chat execution section 13B may execute the processing for leaving the system voice chat room in which the user A is participating, or the game execution section 18B may execute processing to join the same group as user A.

Similarly, in the above example, in the case where the user A and the user B participate in the same competition game while in different groups, and the user B participates in the system chat room in which the user A is already participating, while the user B is inquired whether it will leave the system voice chat room in which the user A is participating, or terminate the competition game, without conducting this inquiry, the chat execution section 13B may execute the processing for leaving the system voice chat room in which the user A is participating, or the game execution section 18B may terminate the game.

<Modification 3>

This example prevents cheating by permitting disclosure to all users participating in a game that the user A and the user B participate in the same system voice chat and participate in the competition game while belonging to different groups as a condition.

In other words, when a user overlapping as a game participant and a chat participant exists, the game execution section 18 generates a game participant list associating overlapping users (user A and user B), transmitting it over the Internet 30 to the client terminal devices 1 of other users participating in the game. The game execution section 18 of the respective client terminal devices 1 references the received participant list and associates and displays the user A and the user B in a player list on the game screen, which is displayed on the monitor device 10 (for example, displaying by giving the same mark to the nickname of the user A and the nickname of the user B).

<Modification 4>

While cheating is prevented in the above Modification 2 by preventing leaving from and entering in a system voice chat room, in this example, cheating is prevented instead by prohibiting transmission and reception of voice data in the system voice chat.

In other words, in the above first case, when there is a user overlapping in the game participant list and the chat participant list, the game execution section 18B displays on the monitor device 10B a selection screen for making the user B select whether or not to prohibit transmission and reception of voice data in the system voice chat in which the overlapping user (user A) is participating, and when the user B selects to prohibit transmission and reception of voice data in the system voice chat in which the overlapping user A is participating, the chat execution section 13B prohibits transmission and reception of voice data in the system voice chat room, the game execution section 18B displays on the monitor device 10B all groups including Group X as available groups, and the user B arbitrarily selects a group to join from all of the groups. Meanwhile, when the user B has selected not to prohibit transmission and reception of voice data in the system voice chat room in which the user A is participating, the game execution section 18B displays on the monitor device 10B only Group X as an available group, and selection of only Group X is permitted to the user B.

On the other hand, in the above second case, when another user overlaps in the game participant list and the chat participant list, and that overlapping user (user A) belongs to a group other than the group to which the user B belongs, the game execution section 18 temporarily interrupts the game processing, and displays on the monitor device 10B a selection screen for the user B to select either termination of the game or prohibition of transmission and reception of voice data in the system voice chat room in which another overlapping user (user A) is participating. If the user B selects termination of the game, the game execution section 18 terminates the interrupted game processing. Moreover, if the user B selects prohibition of transmission and reception of voice data in the system voice chat room, the chat execution section 13B prohibits transmission and reception of voice data in the system voice chat room, and the game execution section 18B restarts the interrupted game processing.

Note that while in the above Modifications 1 to 3, the chat execution section 13 provides a chat participant list of the system voice chat room to the game execution section 18, the same processing may be executed for the text chat room.

The descriptions of the above embodiments and modifications are merely examples. Therefore, the present invention is not limited to the above embodiments and modifications, and other various changes may be made without departing from the technical spirit or scope of the present invention.

INDUSTRIAL APPLICABILITY

The present invention may be suitably used for a chat system using message data.

The invention claimed is:

1. An information processing unit of a chat system where the information processing unit and a server device are connected allowing transmission and reception of message data via a network, said information processing unit comprising:
a storage unit for storing room-specific information, which allows the information processing unit in the chat system to specify one or more available chat rooms, and room attribute information associated with the room-specific information; and
a display controller for displaying on a display means the room attribute information and room corresponding images corresponding to the room-specific information in a mode allowing visible confirmation that the room-specific information and the room attribute information are associated, where the room attribute information includes information indicating whether or not a user of the information processing unit previously participated in one or more of the chat rooms,
wherein the display controller operates to display on the display means a room selection screen with the room corresponding images corresponding to the available chat rooms specified by the room specific information stored in the storage unit.

2. The information processing unit according to claim 1, further comprising:
a storage controller for associating chat history information received by the information processing unit from the server device through participation in one or more of the chat rooms of the server device with reception time and date and room-specific information specifying the one or more chat rooms, and storing the associated information in the storage unit,
wherein the display controller displays on a display means the chat history information and room corresponding image corresponding to the room-specific information in a mode allowing visible confirmation that the room-specific information and the chat history information are associated.

3. The information processing unit according to claim 1, wherein the room attribute information includes information indicating whether or not one or more of the chat rooms are occupied.

4. The information processing unit according to claim 1, comprising: a participation processing execution means for executing processing, in accordance with an operation input specifying the room corresponding image, for allowing participation in a given chat room that corresponds to a corresponding one of the room corresponding images.

5. The information processing unit according to claim 1, further comprising:
a storage controller for associating chat history information that the information processing unit receives from the server device through participation in one or more of the chat rooms of the server device with reception time and date and room-specific information specifying the one or more chat rooms, and storing the associated information in the storage unit,
wherein the display controller operates to display on the display means images for the chat history information lined up in a time series on one or more chat screens of the one or more chat rooms.

6. The information processing unit according to claim 5, wherein
the storage unit is stored with room attribute information associated with the room-specific information, and
the display controller displays room attribute information associated with room-specific information of the one or more chat rooms on one or more chat screens of the one or more chat rooms.

7. An image display method implemented by an information processing unit of a chat system where the information processing unit and a server device are connected allowing transmission and reception of message data via a network, said image display method comprising the steps of:
storing room-specific information for the information processing unit in the chat system to specify one or more available chat rooms, and room attribute information associated with the room-specific information;
displaying on a display means the room attribute information and room corresponding images corresponding to the room-specific information in a mode allowing visible confirmation that the room-specific information and the room attribute information are associated, where the room attribute information includes information indicating whether or not a user of the information processing unit previously participated in one or more of the chat rooms; and
displaying on the display means a room selection screen with the room corresponding images corresponding to the available chat rooms specified by the room specific information stored in the storage unit.

8. The method of claim 7, further comprising the steps of:
associating chat history information received by the information processing unit from the server device through participation in one or more of the chat rooms of the server device with reception time and date and room-specific information specifying the one or more chat rooms, and storing the associated information in the storage unit; and displaying on the display means images for the chat history information lined up in a time series on one or more chat screens of the one or more chat rooms.

9. A non-transitory, computer readable storage medium containing an image processing program, which when executed by a computer of an information processing unit in a chat system, in which the information processing unit and a server device are connected allowing transmission and reception of message data via a network, causing the information processing unit to function as:

a storage unit for storing room-specific information for the information processing unit in the chat system to specify one or more available chat rooms, and room attribute information associated with the room-specific information; and a display controller for displaying on a display means the room attribute information and room corresponding images corresponding to the room-specific information in a mode allowing visible confirmation that the room-specific information and the room attribute information are associated, where the room attribute information includes information indicating whether or not a user of the information processing unit previously participated in one or more of the chat rooms, wherein the display controller operates to display on the display means a room selection screen with the room corresponding images corresponding to the available chat rooms specified by the room specific information stored in the storage unit.

10. The non-transitory, computer readable storage medium of claim 9, wherein the image processing program causing the information processing unit to function as a storage controller for associating chat history information that the information processing unit receives from the server device through participation in one or more of the chat rooms of the server device with reception time and date and room-specific information specifying the one or more chat rooms, and storing the associated information in a storage unit, wherein the display controller operates to display on the display means images for the chat history information lined up in a time series on one or more chat screens of the one or more chat rooms.

11. The information processing unit according to claim 1, further comprising:

a game execution means for executing game processing, and the game execution means acquires chat participant information received by the information processing unit transmitted from the server device.

* * * * *